(12) United States Patent
Yoon et al.

(10) Patent No.: US 12,448,724 B2
(45) Date of Patent: Oct. 21, 2025

(54) LAUNDRY TREATING APPARATUS

(71) Applicant: LG Electronics Inc., Seoul (KR)

(72) Inventors: Juhan Yoon, Seoul (KR); Sanghun Kim, Seoul (KR); Jinwoo Bae, Seoul (KR); Wonick Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 856 days.

(21) Appl. No.: 17/680,795

(22) Filed: Feb. 25, 2022

(65) Prior Publication Data

US 2022/0267943 A1    Aug. 25, 2022

(30) Foreign Application Priority Data

Feb. 25, 2021 (KR) .................. 10-2021-0025674

(51) Int. Cl.
*D06F 58/20* (2006.01)
*D06F 58/04* (2006.01)

(52) U.S. Cl.
CPC ............ *D06F 58/206* (2013.01); *D06F 58/04* (2013.01)

(58) Field of Classification Search
None
See application file for complete search history.

(56) References Cited

U.S. PATENT DOCUMENTS

| | | |
|---|---|---|
| 2007/0271814 A1 | 11/2007 | Bae et al. |
| 2011/0209357 A1 | 9/2011 | Ediger et al. |
| 2013/0042500 A1 | 2/2013 | Hong et al. |

FOREIGN PATENT DOCUMENTS

| | | | | |
|---|---|---|---|---|
| CN | 1782173 | | 6/2006 | |
| CN | 101092784 | | 12/2007 | |
| CN | 102782206 | | 11/2012 | |
| CN | 104131443 | | 11/2014 | |
| CN | 202786854 | | 3/2018 | |
| CN | 108265490 | | 7/2018 | |
| CN | 112088231 | | 12/2020 | |
| DE | 102015214205 | | 3/2016 | |
| EP | 1964964 | | 9/2008 | |
| EP | 2631352 | | 8/2013 | |
| EP | 3138951 | A1 * | 3/2017 | ............ D06F 58/02 |
| JP | 2016005494 | | 1/2016 | |
| KR | 10-2019-0121656 | | 10/2019 | |

(Continued)

OTHER PUBLICATIONS

International Search Report in International Appln. No. PCT/KR2022/002703, dated Jun. 15, 2022, 8 pages.

(Continued)

*Primary Examiner* — Jason Lau
(74) *Attorney, Agent, or Firm* — Fish & Richardson P.C.

(57) ABSTRACT

A laundry treating apparatus includes a cabinet, a drum, an air supply disposed inside the cabinet and configured to supply air toward the drum, a rear plate that defines a rear duct configured to receive the air from the air supply and guide the air into the drum, a fan duct that connects the air supply to the rear duct, and a duct plate that covers a portion of the rear duct and is coupled to the fan duct. The rear duct includes a flow portion that is configured to carry the air received from the fan duct and an inlet that extends from the flow portion toward the fan duct and has an inlet front surface that is open toward the drum and covered by the duct plate.

20 Claims, 10 Drawing Sheets

(56) References Cited

FOREIGN PATENT DOCUMENTS

| WO | WO 2013/127656 | 9/2013 |
| WO | WO2016034220 | 3/2016 |

OTHER PUBLICATIONS

Extended European Search Report in European Appln. No. 22158704.1, dated Jul. 21, 2022, 9 pages.
Office Action in Chinese Appln. No. 202210178996.X, mailed on Mar. 31, 2023, 12 pages(with English translation).

* cited by examiner

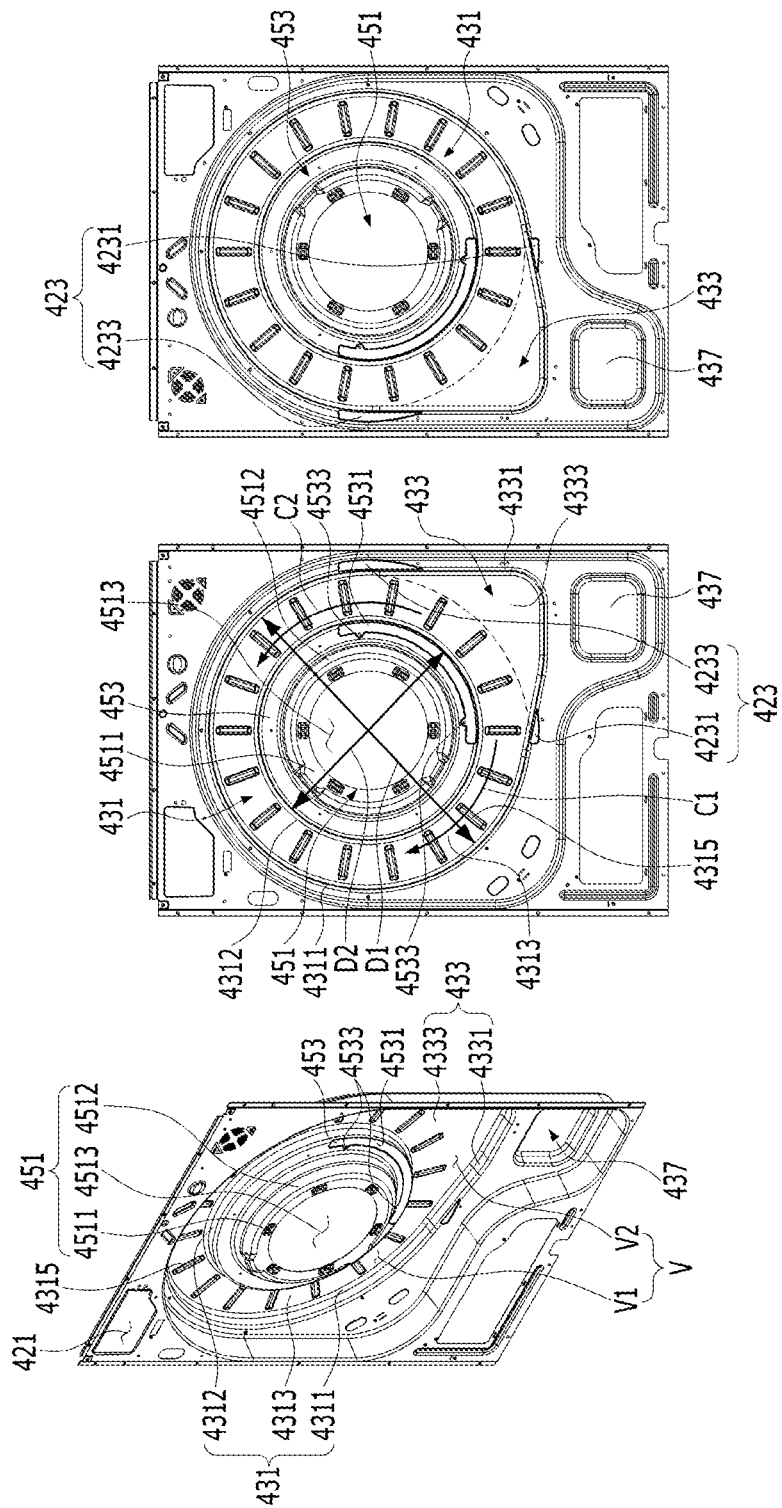

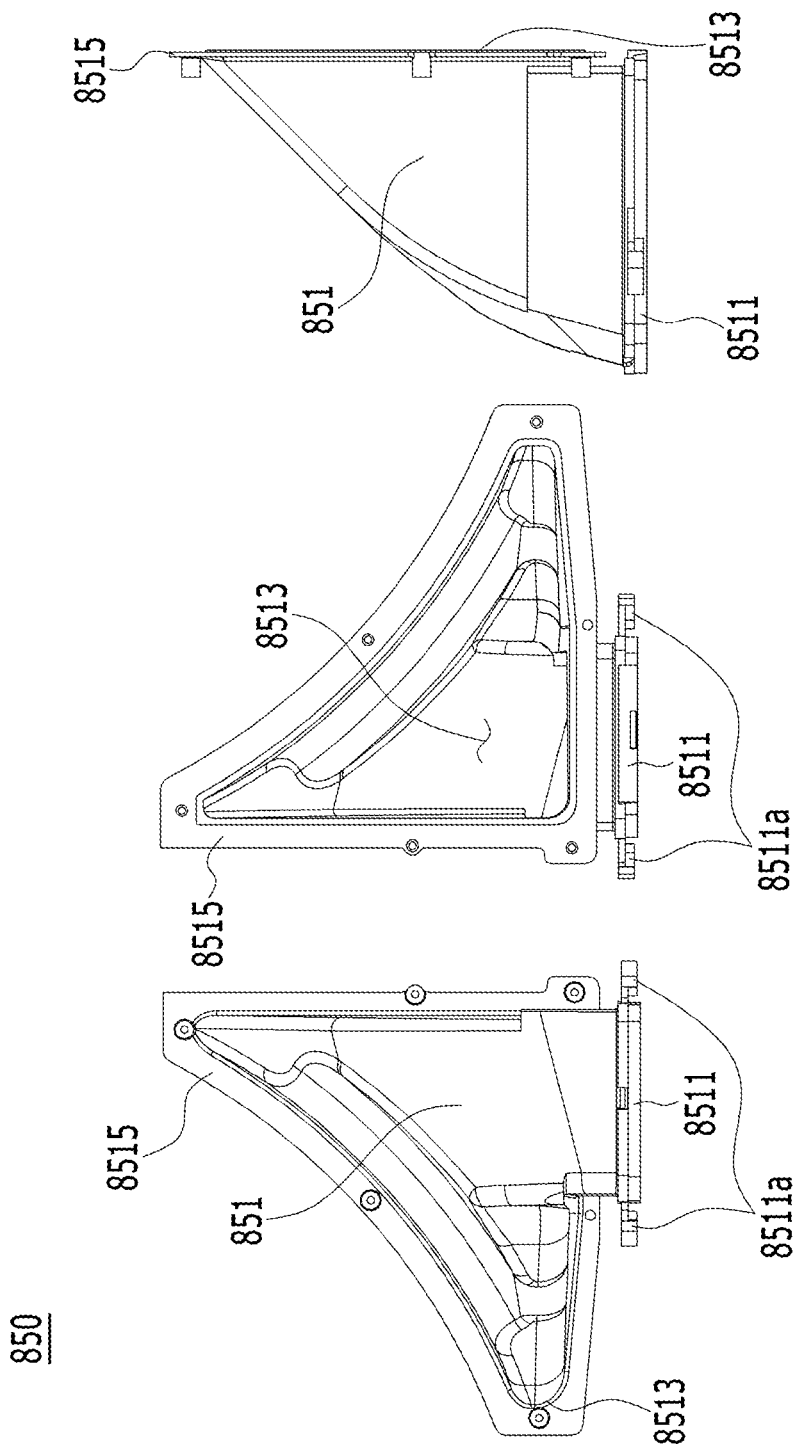

LAUNDRY TREATING APPARATUS

CROSS-REFERENCE TO RELATED APPLICATIONS

This application claims the benefit of Korean Patent Application No. 10-2021-0025674, filed on Feb. 25, 2021, which is hereby incorporated by reference as if fully set forth herein.

TECHNICAL FIELD

The present disclosure relates to a laundry treating apparatus, and more particularly, to a laundry treating apparatus including a drum configured to accommodate laundry and a driver directly connected to the drum and configured to rotate the drum.

BACKGROUND

A laundry treating apparatus may refer to a washing machine for washing laundry (an object to be washed or an object to be dried), a dryer for drying the laundry, and an apparatus capable of performing both the washing and the drying of the laundry.

For example, the dryer may include a drying configured to receive laundry, a driver (drying driver) that rotates the drying drum, a heat exchanger that removes moisture from the laundry by supplying hot air to the drying drum, and a hot air flow channel through which the hot air flows.

In some cases, the drying driver may include a motor, a pulley fixed to a rotation shaft of the motor, and a belt (a power transmitter) connecting a rotational motion of the pulley to the drying drum.

That is, the drying driver may be connected to the drying drum through the power transmitter such as the belt. In some cases, the drying driver may be fixed to a base that supports a lower portion of the laundry treating apparatus and configured to rotate the drying drum through the belt.

In some cases, the hot air flow channel may be spaced apart from the drying driver and connect a front surface of the drum to a rear surface of the drum. The flow channel may guide the hot air therein. In some cases, the hot air flow channel may directly connect the front surface and the rear surface of the drum to each other and be spaced apart from the drying driver, and may provide space for circulating the hot air.

In some cases, the number of rotations and a rotation direction of the drying drum may be changed to control a movement of the laundry inside the drying drum, thereby shortening of drying time and improving a drying performance. Accordingly, the drying driver may be directly coupled to the drying drum to change the rotation speed and the rotation direction.

In some cases, a separate component may be provided for guiding the hot air to the drying drum independently of the hot air flow channel. In some cases, a shape of the hot air flow channel may be changed depending on an arrangement change of the drying driver. In some cases, the dryer may include a connector that connects the hot air flow channel to the separate component for guiding the hot air into the drying drum, and a plate for fixing the connector. The connector and the plate for fixing the connector may be designed to improve the drying efficiency and efficiently utilize a space inside the dryer.

SUMMARY

The present disclosure describes a laundry treating apparatus including a fan duct that can efficiently guide hot air from a hot air supply to a duct and a duct plate that can fix the fan duct.

The present disclosure describes a laundry treating apparatus including a duct plate that can help to prevent leakage of hot air introduced into an inlet.

The present disclosure describes a laundry treating apparatus including a duct plate that can efficiently guide hot air introduced into an inlet to a flow portion.

The present disclosure describes a laundry treating apparatus including a duct plate that can be efficiently fixed to a rear plate.

The present disclosure describes a laundry treating apparatus including a fan duct that connects a hot air supply and a duct of a rear plate to each other, and a duct plate that shields the duct of the rear plate and is coupled with the fan duct.

The present disclosure describes a laundry treating apparatus including a duct plate that shields an inlet of the duct or an entirety of the inlet and a portion of a flow portion.

The present disclosure describes a laundry treating apparatus that can help to avoid interference between a drum and the fan duct by coupling the fan duct to the duct plate at a location outward of the drum.

According to one aspect of the subject matter described in this application, a laundry treating apparatus includes a cabinet having a laundry inlet defined at a front surface thereof, a drum rotatably disposed inside the cabinet and configured to accommodate laundry received through the laundry inlet, an air supply disposed inside the cabinet and configured to supply air toward the drum, and a rear plate that defines a rear surface of the cabinet, where the rear plate defines a rear duct configured to receive the air supplied from the air supply and to guide the air into the drum. The laundry treating apparatus further includes a fan duct that connects the air supply to the rear duct and is configured to guide the air from the air supply to the rear duct, and a duct plate that covers a portion of the rear duct and is coupled to the fan duct. The rear duct includes a flow portion configured to carry the air received from the fan duct, where the flow portion has an open front surface configured to provide the air to the drum. The rear duct further includes an inlet that extends from the flow portion toward the fan duct, where the inlet has an inlet front surface that is open toward the drum and covered by the duct plate.

Implementations according to this aspect can include one or more of the following features. For example, the flow portion and the inlet can be recessed rearward from a front surface of the rear plate facing the drum, where the duct plate can be coupled to the front surface of the rear plate, and an area of the duct plate can be greater than an area of the inlet front surface such that the duct plate covers the inlet front surface. In some examples, the fan duct can include a fan duct outlet opened toward an interior of the inlet and configured to discharge the air supplied from the air supply toward the flow portion, and a fan duct coupling portion that extends along a circumference of the fan duct outlet and is coupled to the duct plate. In some examples, the fan duct can be disposed radially outward relative to the drum, and a portion of the circumference of the fan duct outlet can face the drum and be recessed away from the drum to thereby be spaced apart from the drum.

In some implementations, the duct plate can include an inlet shielding portion that covers the inlet front surface and is coupled to the fan duct, and a flow portion shielding portion that extends from the inlet shielding portion toward the flow portion and covers a portion of the open front surface of the flow portion. In some examples, the inlet shielding portion can extend to an outer circumference of the flow portion, and the flow portion shielding portion can extend from the outer circumference of the flow portion to an interior of the flow portion. In some examples, the flow portion can have an annular shape extending in a circumferential direction, where a circumferential length of the flow portion shielding portion in the circumferential direction can be greater than a circumferential length of the inlet in the circumferential direction. The flow portion shielding portion can be connected to the inlet shielding portion at a position radially outward of a circumference of the inlet.

In some implementations, the flow portion can have an annular shape and be configured to guide the air introduced from the inlet in a first circumferential direction and a second circumferential direction opposite to the first circumferential direction, where the flow portion shielding portion extends farther than the inlet front surface in the first circumferential direction and in the second circumferential direction.

In some implementations, the laundry treating apparatus can include a driver coupled to the rear plate from a rear side of the rear plate and configured to rotate the drum, where the rear plate can include a mounting portion that is surrounded by the flow portion, the driver being coupled to a center of the mounting portion. The flow portion shielding portion can include a flow portion coupling portion that extends toward the driver and is coupled to the mounting portion from a front side of the mounting portion. In some examples, the mounting portion can include a mounting accommodating portion that protrudes forward relative to the flow portion and is coupled to the driver, and a mounting circumferential portion that surrounds the mounting accommodating portion and faces an inner circumference of the flow portion. An end of the flow portion coupling portion can protrude to the mounting circumferential portion and be in contact with a circumference of the mounting circumferential portion.

In some implementations, the flow portion shielding portion can further include a flow portion support that protrudes rearward from the flow portion coupling portion and extends along the mounting circumferential portion, where the mounting portion defines a mounting support that accommodates the flow portion support therein. The mounting support can be recessed from the mounting circumferential portion in a shape corresponding to the flow portion support. In some examples, the mounting support can be defined at a portion where the mounting circumferential portion and the flow portion are connected to each other.

In some implementations, the laundry treating apparatus can include an inner sealing portion that is disposed at the mounting circumferential portion and extends in an annular shape along the inner circumference of the flow portion, where the drum has a drum inlet defined at a rear surface of the drum and configured to receive the air from the flow portion. The inner sealing portion can be configured to block the air from leaking out of the drum inlet and the flow portion, and a portion of a circumference of the inner sealing portion can be disposed at and supported by the flow portion support.

In some implementations, the duct plate can include an inlet support that protrudes rearward from a boundary between the flow portion shielding portion and the inlet shielding portion, where the inlet support extends along the boundary. In some examples, ends of the inlet support can be disposed outside the inlet, and the rear plate can define inlet support coupling portions that are recessed away from the drum and coupled to the ends of the inlet support, respectively, where the inlet support coupling portions can have shapes corresponding to the ends of the inlet support.

In some implementations, the laundry treating apparatus can further include an outer sealing portion that is disposed at the front surface of the rear plate and extends in an annular shape along the outer circumference of the flow portion, where the drum has a drum inlet defined at a rear surface of the drum and configured to receive the air from the flow portion. The outer sealing portion can be configured to block the air from leaking out of the drum inlet and the flow portion, and a portion of a circumference of the outer sealing portion can be disposed at and supported by the inlet support.

In some implementations, the rear plate can further include an air disposition portion spaced apart from the inlet and recessed rearward from a front surface of the rear plate facing the drum, where the air disposition portion is opened toward the drum and receives a portion of the air supply. In some examples, the air disposition portion and the inlet can be separate spaces defined at the front surface of the rear plate, where the air disposition portion is spaced apart from the duct plate. In some examples, the air supply can include a blower configured to cause the air to move into the drum along the air supply, where the air disposition portion receives a portion of the blower.

In some implementations, the flow portion can have an annular shape extending in a circumferential direction, where the inlet extends radially outward from a portion of the flow portion, and the air disposition portion is defined at a position below the inlet.

In some implementations, the structural stability can be increased as the fan duct is fixed to the duct plate.

In some implementations, the duct plate can help to prevent the hot air introduced into the inlet from leaking to the portions other than the flow portion as much as possible. In some implementations, the duct plate can guide the hot air in the balanced manner into the flow portion. In some implementations, the duct plate can be strongly supported by the rear plate and can effectively shield a portion of the duct.

BRIEF DESCRIPTION OF THE DRAWINGS

FIGS. 5A to 5C are views showing an example of a rear plate of the laundry treating apparatus.

FIGS. 10A to 10C are views showing the fan duct.

DETAILED DESCRIPTION

Hereinafter, one or more implementations of the present disclosure will be described in detail with reference to the accompanying drawings such that a person having ordinary knowledge in the technical field to which the present disclosure belongs can easily implement the implementation.

Figure 1:
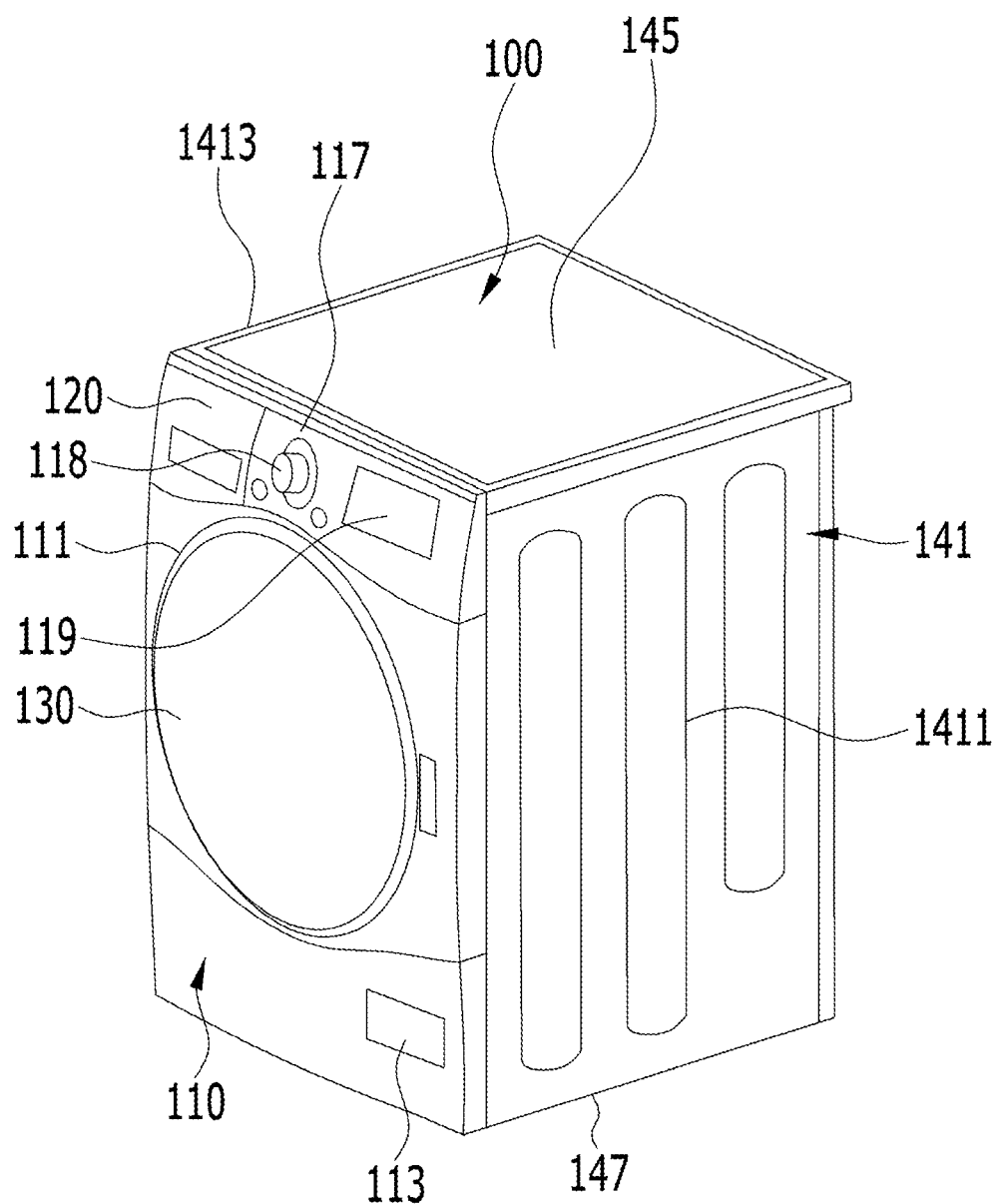
FIG. 1 is a perspective view showing an example of a laundry treating apparatus.
Figure 2:
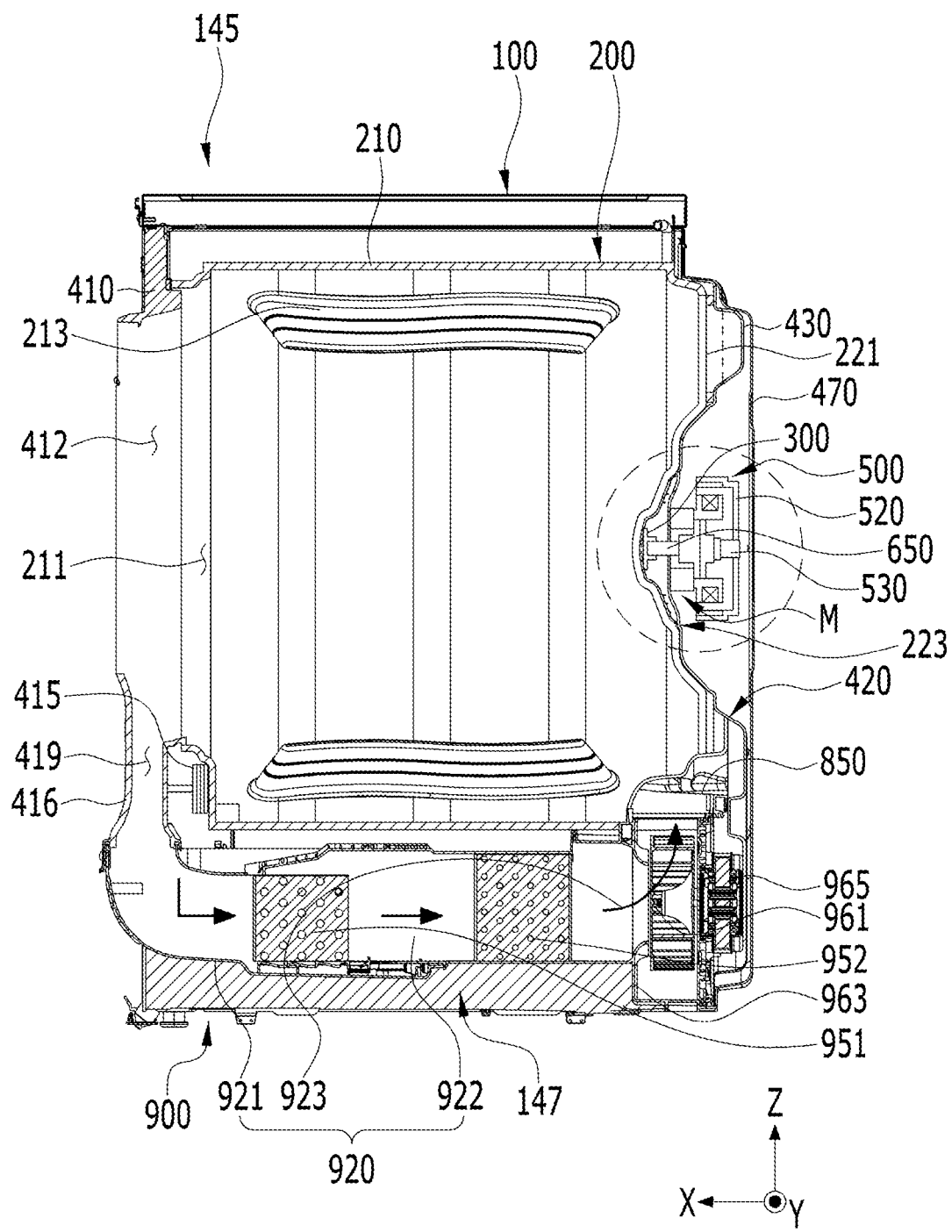
FIG. 2 is a view showing an example of an internal cross-section of the laundry treating apparatus shown in FIG. 1.

FIG. 1 is a perspective view showing an example of a laundry treating apparatus, and FIG. 2 is a view showing an example of an internal cross-section of the laundry treating apparatus shown in FIG. 1.

Referring to FIGS. 1 and 2, the laundry treating apparatus can include a cabinet 100 that defines an outer appearance of the laundry treating apparatus.

In some implementations, the cabinet 100 can have a front plate 410 forming a front surface thereof, side plates 141 respectively forming both side surfaces thereof, a top plate 145 forming a top surface thereof, and a bottom plate 147 forming a bottom surface thereof.

In some examples, the front plate 410, the side plates 141, the top plate 145, and the bottom plate 147 can be connected to each other to define a space in the cabinet 100. In addition, the cabinet 100 can further include a rear plate 420 that defines a rear surface of the cabinet 1000, where the rear plate 420 can be coupled to the cabinet 100 from a rear side of the cabinet 100 and cover the interior of the cabinet 100.

That is, the rear plate 420 can form the rear surface of the cabinet 100. In some examples, referring to FIG. 2, a rear cover 470, which will be described later, can be coupled to the rear plate 420 from the rear, and the rear cover 470 can form the rear surface of the cabinet 100. In addition, the rear cover 470 and the rear plate 420 together can form the rear surface of the cabinet.

As the interior of the cabinet 100 can be shielded from the outside because of the rear plate 420, a drum 200, a hot air supply 900, a water collector 170, and the like can be disposed inside the cabinet 100, and the components disposed inside the cabinet 100 can be prevented from being exposed to the outside.

The front plate 410 and the rear plate 420 will be described later in detail.

In some examples, the cabinet 100 can further include a front panel 110 coupled to the front plate 410 from the front. The front panel 110 can be coupled to a front surface of the front plate 410 to prevent the front plate 410 and components coupled to the front plate 410 from being exposed to the outside.

That is, the front panel 110 can form the front surface of the cabinet 100 together with the front plate 410. The front panel 110 can be formed integrally with or formed separately from the front plate 410. In FIGS. 1 and 2, the front panel 110 and the front plate 410 are illustrated as being separately formed, but the present disclosure should not be construed as being limited thereto.

The front panel 110 can include a laundry inlet 111 defined to be in communication with the drum 200 to be described later and a door 130 pivotably coupled to the cabinet to open and close the laundry inlet 111.

A control panel 117 can be installed on the front panel 110. The control panel 117 can include an input device 118 for receiving a control command from a user, and a display 119 for outputting information such as a control command or the like selectable by the user. The control command can include a drying course or a drying option capable of performing a series of drying operations. The control panel 117 can include a main controller for controlling a command for performing the drying course or the drying option.

The input device 118 can include a power supply requesting device that requests power supply of the laundry treating apparatus, a course input device that allows the user to select a course among a number of courses, and an execution requesting device that requests start of the course selected by the user.

The display 119 can include at least one of a display panel capable of outputting text and figures, and a speaker capable of outputting a voice signal and sound.

In some examples, the laundry treating apparatus can include a water storage 7 constructed to separately store moisture generated in a process of drying laundry. The water storage 7 can include a water storage tank that is constructed to be withdrawn from one side of the front panel 110 to the outside. The water storage tank can be constructed to collect condensed water received from a drain pump to be described later.

The user can remove the condensed water by withdrawing the water storage tank from the cabinet 100 and then re-install the water storage tank in the cabinet 100. Accordingly, the laundry treating apparatus can be disposed at any place where a sewer or the like is not installed.

In some examples, the water storage 7 can be disposed above the door 130. Accordingly, when the user withdraws the water storage tank from the front panel 110, the user is able to bend a waist relatively less.

The laundry treating apparatus can further include a filter member capable of removing foreign substances from a circulation flow channel. The front panel 110 can include a filter mounting hole 113 defined such that the filter member is withdrawn or inserted.

Figure 3:
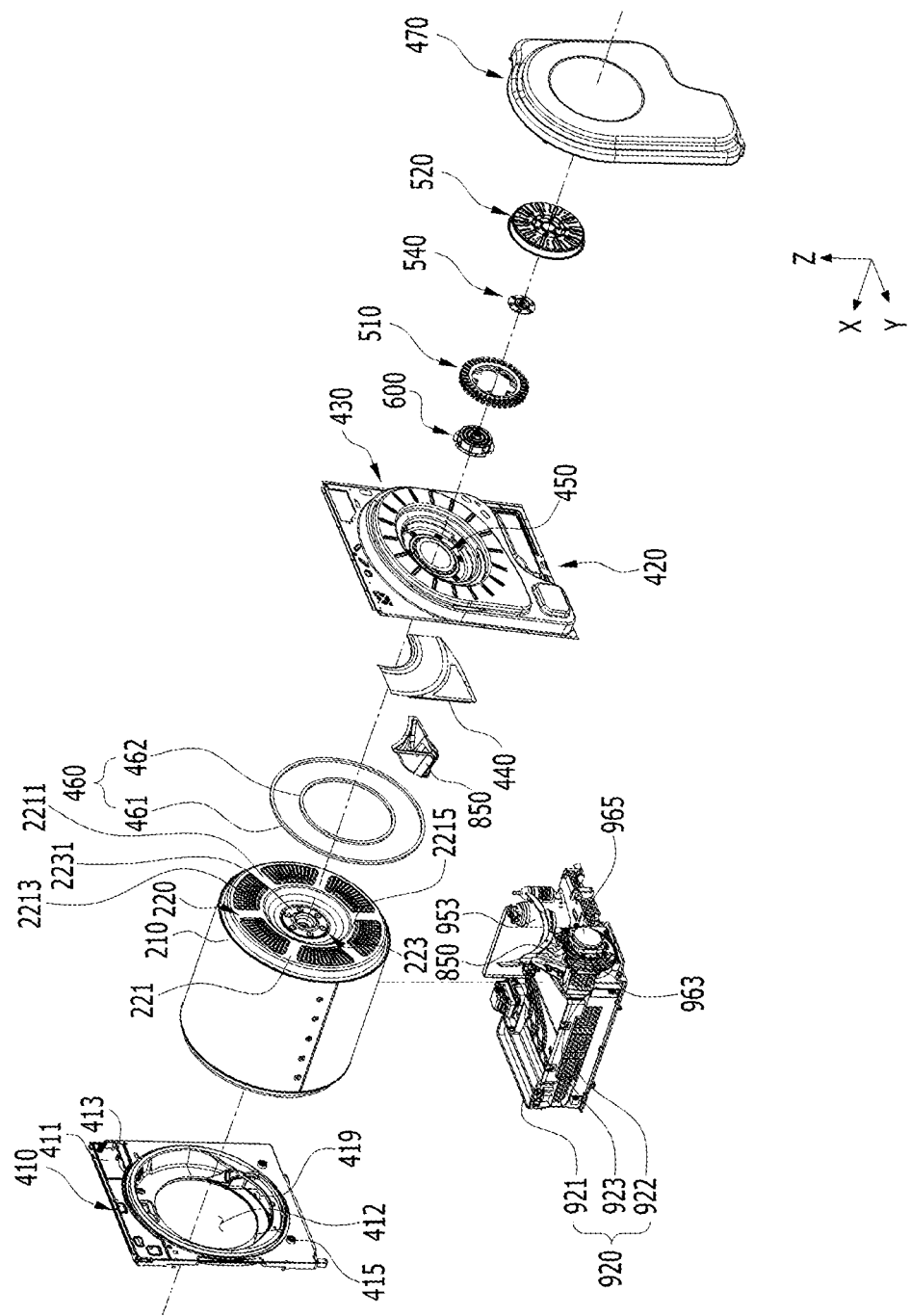
FIG. 3 is an exploded perspective view showing example components of the laundry treating apparatus.

FIG. 3 is an exploded perspective view of a laundry treating apparatus.

Referring to FIGS. 2 and 3, the laundry treating apparatus can include the drum 200 accommodated inside the cabinet 100 and accommodating the laundry therein, a driver M that rotates the drum 200, and the hot air supply 900 constructed to supply hot air to the drum 200.

The drum 200 can be formed in a cylindrical shape to accommodate the laundry therein. In some examples, where water is not supplied into the drum 200 and the water condensed inside the drum 200 is not discharged to the outside, a through-hole defined along a circumference of the drum 200 can be omitted.

The driver M can be in direct connection with the drum 200 to rotate the drum 200. For example, the driver M can be formed in a direct drive (DD) type. Accordingly, the driver M can control a rotation direction of the drum 200 or a rotation speed of the drum 200 by directly rotating the drum 200 by omitting a component such as a belt, a pulley, and the like.

In the case of the DD type washing machine, the driver M can be coupled and fixed to a tub that accommodates the drum 200 therein, and the drum 200 can be coupled to the driver M and supported by the tub. In some cases, where the laundry treating apparatus is configured to perform a drying operation, a tub accommodating the drum 200 can be omitted.

Accordingly, the laundry treating apparatus can further include a support 400 constructed to fix or support the drum 200 or the driver M inside the cabinet 100. The support 400 can include the front plate 410 and the rear plate 420 described above.

The front plate 410 can be disposed in front of the drum 200, and the rear plate 420 can be disposed at the rear of the drum 200.

The front plate 410 and the rear plate 420 can be formed in a plate shape and respectively disposed to face a front surface and a rear surface of the drum 200. A distance between the front plate 410 and the rear plate 420 can be the same as a length of the drum 200 or can be set to be greater than the length of the drum 200.

The drum 200 can include a drum inlet 211 having an open front surface. The drum inlet 211 can be in communication with the laundry inlet 111 defined in the front panel 110 through the front plate 410. The driver M can be installed on the rear plate 420 and connected to the rear surface of the drum 200 as the drum inlet 211 is defined in the front surface of the drum 200.

The rear plate 420 can be constructed such that the driver M is mounted and supported thereon in a region facing the rear surface of the drum 200. Accordingly, the driver M can rotate the drum 200 in a state in which a position thereof is stably fixed through the rear plate 420.

At least one of the front plate 410 and the rear plate 420 can rotatably support the drum 200. At least one of the front plate 410 and the rear plate 420 can rotatably accommodate a front end or a rear end of the drum 200 therein.

For example, the front surface of the drum 200 can be accommodated and rotatably supported in the front plate 410, and the rear surface of the drum 200 can be indirectly supported by the rear plate 420 by being spaced apart from the rear plate 420 and connected to the driver M mounted on the rear plate 420.

Accordingly, a region in which the drum 200 is in contact with or rubbed against the support 400 can be minimized and noise or vibration can be prevented from occurring.

In some examples, the drum 200 can be rotatably supported by both the front plate 410 and the rear plate 420.

In some examples, the laundry treating apparatus can include the circulation flow channel along which, based on the drum 200, air inside the drum 200 is discharged through the front surface of the drum 200, and the discharged air passes through an exterior of the drum 200 and again flows into the rear surface of the drum 200.

The hot air supply 900 can be disposed outside the drum such that the air discharged from the interior of the drum 200 flows therein, and can define a portion of the circulation flow channel. For example, the hot air supply 900 can be placed on the bottom plate 147 of the cabinet 100.

The hot air supply 900 can include an evaporator 951 for cooling the air discharged from the interior of the drum 200 and condensing water vapor contained in the air, and a condenser 952 for heating the air that has passed through the evaporator 951. The hot air supply 900 can be constructed to supply the air that has passed through the condenser 952 back into the drum 200.

The air discharged from the interior of the drum 200 can change in a temperature and a water vapor content by the hot air supply 900, and can dry the laundry accommodated in the drum 200 through continuous circulation by flowing along the circulation flow channel.

The air located inside the drum 200 can be hot air circulating along the circulation flow channel. That is, the air whose properties are changed by the hot air supply 900 and circulating along the circulation flow channel can be referred to as the hot air. The air and the hot air can be used as the same meaning hereinafter for convenience of description. A specific configuration of the hot air supply 900 will be described later.

The drum 200 can be disposed above the hot air supply 900, so that the drum inlet 211 of the drum 200 can be disposed at a relatively high position inside the cabinet 100. The user can easily withdraw the laundry located inside the drum 200.

As described above, the hot air supply 900 can have a plurality of heat exchangers installed therein for cooling or heating the hot air flowing therein, and can have a washer 940 installed therein for removing foreign substances attached to the heat exchanger using the condensed water in which the water vapor contained in the hot air is condensed.

Referring back to FIGS. 2 and 3, the drum 200 of the laundry treating apparatus can be rotated by being directly coupled to the driver M rather than being rotated by being indirectly coupled to a belt or the like. Therefore, unlike the drum of the conventional dryer formed in a cylindrical shape with open front and rear surfaces, the drum 200 of the laundry treating apparatus can have the shielded rear surface and be directly coupled to the driver M.

Specifically, the drum 200 can include a drum body 210 formed in a cylindrical shape to accommodate the laundry therein, and a drum rear surface 220 coupled to the drum body 210 from the rear to form the rear surface of the drum 200. That is, the drum rear surface 220 can refer to the rear surface of the drum 200.

The drum rear surface 220 can be constructed to shield the drum body 210 from the rear and can be coupled to a drum rotating shaft 650 of the driver M. That is, the drum rear surface 220 can be constructed so as to be connected to the driver M to receive power from the drum rotating shaft 650 to rotate the drum body 210. As a result, the drum inlet 211 into which the laundry is put can be defined in front of the drum body 210 and the drum body 210 can be shielded by the drum rear surface 220 from the rear.

FIG. 2 schematically shows a bushing. Referring back to FIG. 2, a bushing 300 can be coupled to or formed integrally with the drum rear surface 220. The drum rotating shaft 650 of the driver M can be coupled to the bushing 300, and the drum rear surface 220 can be coupled to the drum rotating shaft 650 through the bushing 300. The drum rotating shaft 650 can be coupled to the drum rear surface 220 from the rear through the bushing 300, or can penetrate the drum rear surface 220 through the bushing 300 such that a front end thereof is positioned inside the drum 200.

When the drum rotating shaft 650 penetrates the drum 200, the front end of the drum rotating shaft 650 can be coupled to fixing fastening means for fixing the drum rotating shaft 650 in an axial direction. In addition, a cap for preventing contact between the drum rotating shaft 650 and the laundry, and suppressing heat transfer can be installed inside the drum 200.

As a result, the drum 200 of the laundry treating apparatus may not be rotated by the belt or the like, but can be rotated as the drum rear surface 220 is directly coupled to the driver M.

Therefore, even when the driver M changes the rotation direction or a rotation acceleration is large, the drum 200 of the laundry treating apparatus can be rotated by reflecting the same immediately.

In addition, the driver M can include a motor 500 and a reducer 600. The reducer 600 can be coupled to a rear surface of the rear plate 420, and the motor 500 can be coupled to the reducer 600. Accordingly, even when vibration is generated in the laundry treating apparatus 10, the motor 500 can vibrate around the reducer 600, so that the reducer 600 and the motor 500 can be coaxially maintained.

Specifically, the motor 500 can include a stator 510 coupled to the reducer 600 and generating a rotating magnetic field, and a rotor 520 rotating by the stator 510. In addition, the motor 500 can include a driving shaft 530 connected to the drum rotating shaft 650 and rotating together with the rotor 520, and a washer 540 that supports the driving shaft 530 and is coupled to the rotor 520.

In some examples, the front plate 410 can include an inlet communication hole 412 penetrating the front plate 410 to accommodate a front portion of the drum body 210 or the drum inlet 211 therein. A gasket 413 for accommodating the drum body 210 can be disposed on an outer circumferential surface of the inlet communication hole 412.

The gasket 413 can rotatably support the drum inlet 211 of the drum body 210 and can be able to be in contact with an outer circumferential surface of the drum inlet 211. The gasket 413 can prevent the hot air inside the drum 200 from leaking between the drum body 210 and the front plate 410.

The gasket 413 can be made of a plastic resin or an elastic material, and a separate sealing member can be additionally coupled to an inner circumferential surface of the gasket 413 to prevent the laundry or the hot air from escaping the drum inlet 211 of the drum body 210 to the front plate 410.

In some examples, a duct communication hole 419 in communication with the drum body 210 such that the hot air injected into the drum body 210 can be discharged can be defined in the inner circumferential surface of the gasket 413 or the inlet communication hole 412. A front flow channel connecting the duct communication hole 419 and the hot air supply 900 to each other can be installed in the front plate 410.

Accordingly, the duct communication hole 419 can guide the hot air discharged from the drum body 210 to be supplied to the hot air supply 900.

The filter member that blocks foreign substances, lint, or the like discharged from the drum 200 from being put to the hot air supply 900 as described above can be installed in the front flow channel.

A front wheel 415 constructed to be able to be in contact with an outer circumferential surface of the drum body 210 to rotatably support the drum 200 can be installed on the front plate 410. The front wheel 415 can be constructed to support an outer circumferential surface of an inlet of the drum body 210, and can include a plurality of front wheels spaced apart from each other along the outer circumferential surface of the inlet communication hole 412. The front wheel 415 can rotate together when the drum 200 rotates while supporting a lower portion of the drum body 210.

The front plate 410 can include a front tank support hole 414, and the water storage tank of the water storage 7 can be inserted into and supported by the front tank support hole 414. The front tank support hole 414 can be defined in a region corresponding to a portion of the front panel 110 where the water storage 7 is disposed, and can be defined through the front plate 410.

The rear plate 420 can include a rear tank support hole 421 defined at a position corresponding to the front tank support hole 414. The water storage tank can be supported by being inserted into the front tank support hole 411 and the rear tank support hole 421 together. The rear tank support hole 421 can be defined through the rear plate 420.

Referring back to FIG. 2, as described above, the hot air supply 900 can define a portion of the circulation flow channel that circulates the hot air to the drum 200. That is, the hot air supply 900 can include a hot air flow channel 920 through which the hot air discharged from the drum 200 can circulate outside the drum 200.

The hot air flow channel 920 can be formed in a shape of a duct disposed outside the drum 200. The hot air flow channel 920 can include a supply duct 921 in communication with the duct communication hole 419 to be supplied with the hot air of the drum 200, a flow duct 922 through which the hot air supplied from the supply duct 921 flows, and a discharge duct 923 through which the hot air that has passed through the flow duct 922 is discharged.

The supply duct 921 can be formed to be in communication with the duct communication hole 419 of the front plate 410 to be in communication with the front flow channel installed inside the front plate 410. The flow duct 922 can extend from a distal end of the supply duct 921 rearwardly of the drum 200. The discharge duct 923 can be disposed at a distal end of the flow duct 922.

In some examples, the hot air supply 900 can include a heat pump 950 that can cool the hot air to remove the water vapor contained in the hot air and re-heat the hot air from which the water vapor has been removed.

The heat pump 950 can include the evaporator 951 that is installed inside the flow duct 922 to cool the hot air to condense the water vapor contained in the hot air, and the condenser 952 that is disposed downstream of the evaporator 951 or disposed to be spaced apart from the evaporator 951 toward the discharge duct 923 and re-heats the hot air.

The heat pump 950 can further include an expansion valve that cools a refrigerant that has passed through the condenser 952 and guides the cooled refrigerant back to the evaporator 951, and a compressor 953 that pressurizes and heats the refrigerant that has passed through the evaporator 951 and supplies the pressurized and heated refrigerant to the condenser 952. The compressor 953 can be disposed outside the flow duct 922. That is, the plurality of heat exchangers described above installed inside the hot air supply 900 can refer to the evaporator 951 and the condenser 952.

In some examples, the hot air supply 900 can further include a blower 960 capable of providing power to circulate the hot air to the drum 200.

The blower 960 can be connected to the hot air flow channel 920. That is, the blower 960 can be connected to the discharge duct 923 from the rear, and can receive the hot air from the discharge duct 923, accelerate the hot air, and guide the hot air to the rear of the drum 200.

The blower 960 can include a blower fan 961 that accelerates the hot air in contact with the hot air, and a blower fan housing 963 connected to the discharge duct 923 and having the blower fan 961 disposed therein.

One side of the blower fan housing 963 can be opened and connected to the discharge duct 923, and the other side thereof can be opened to guide the hot air to the rear of the drum 200. For example, as shown in FIG. 2, the blower fan housing 963 can have an open front surface to be connected to the discharge duct 923, and can have an open top surface to guide the hot air to the rear of the drum 200.

In addition, the blower 960 can further include a blower fan driver 965 coupled to the blower fan housing 963. The blower fan driver 965 can be coupled to the blower fan housing 963 from the rear and connected to the blower fan 961 to provide power to rotate the blower fan 961.

Figure 4:
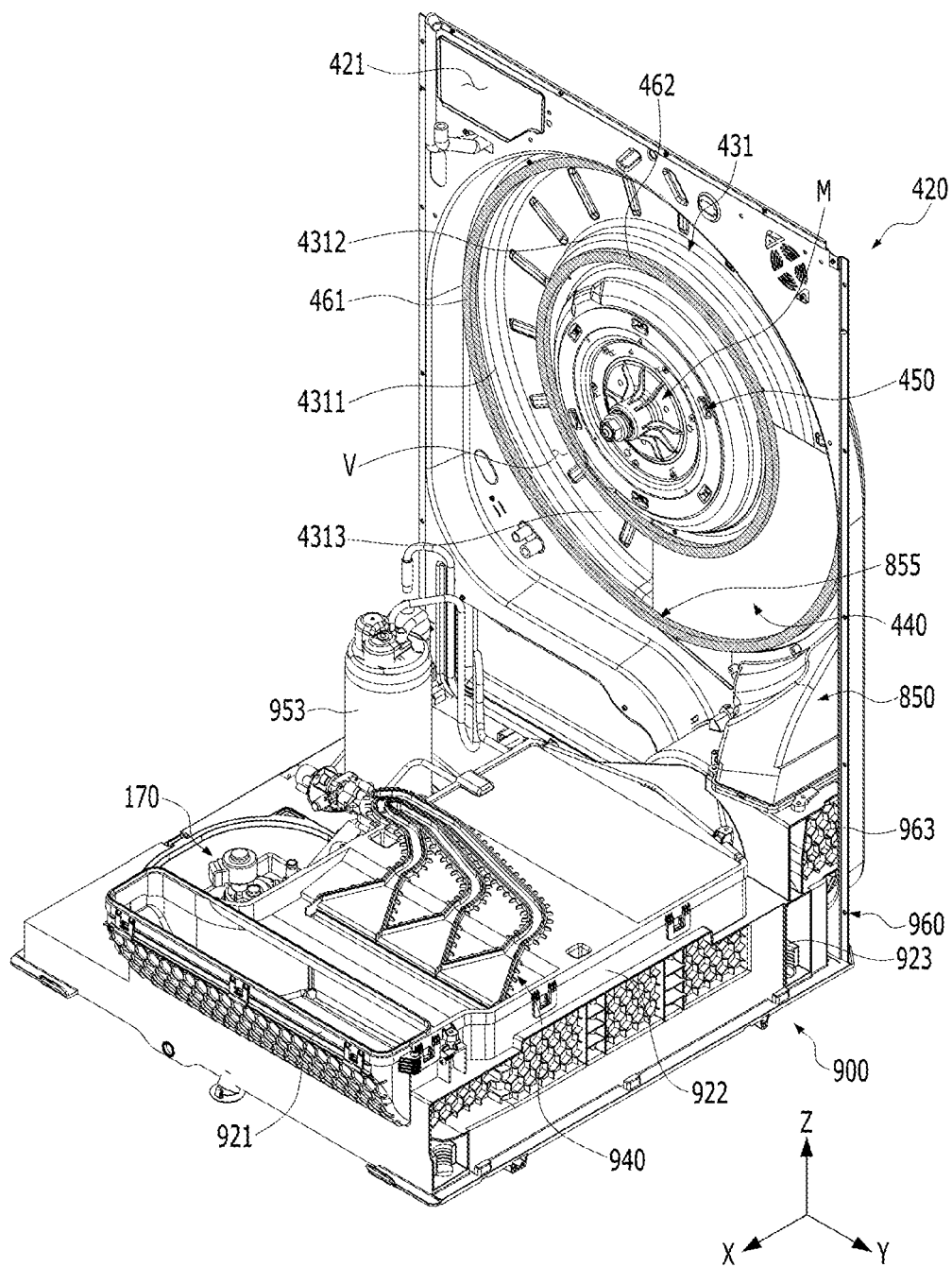
FIG. 4 is a view showing an example of a hot air supply and a rear plate.

In some examples, FIG. 4 is a view showing a bottom plate and a rear plate.

Referring to FIG. 4, a space efficiency of the bottom plate 147 of the cabinet 100 can be increased as the driver M is disposed on the rear plate 420.

Specifically, the bottom plate 147 of the cabinet 100 can have the hot air supply 900 and other components. Other components can include the water collector 170 and the driver M. Other components may not be limited to the water collector 170 and the driver M, and can include any component that can be disposed on the bottom plate 147.

As described above, the hot air supply 900 can include the hot air flow channel 920, the evaporator 951 and the condenser 952 disposed inside the hot air flow channel 920, the compressor 953 disposed outside the hot air flow channel 920, and the blower 960 connected to the hot air flow channel 920.

On the bottom plate 147 of the cabinet 100, the hot air flow channel 920 in which the hot air flows and the blower 960 can be integrally disposed, or the hot air flow channel 920 and the blower 960 can be spaced apart from each other, so that the water collector 170 and the driver M can be disposed.

The space utilization efficiency of the bottom plate 147 of the cabinet 100 can be increased as the driver M is disposed on the rear plate 420 compared to the case in which the driver M is disposed on the bottom plate 147 of the cabinet 100.

That is, the bottom plate 147 of the cabinet 100 can increase a size of the existing component and make an arrangement of existing components to be efficient by utilizing the position where the driver M is disposed compared to the case in which the driver M is disposed on the bottom plate 147 of the cabinet 100.

For example, the water collector 170 can be disposed at the position where the driver M is disposed or extended to the position where the driver M is disposed compared to the case in which the driver M is disposed on the bottom plate 147 of the cabinet 100. That is, the water collector 170 can be larger than in the case in which the driver M is disposed on the bottom plate 147 of the cabinet 100, thereby storing relatively more condensed water.

In some examples, referring to FIGS. 2 and 4, the water collector 170 can be disposed in parallel with the evaporator 951 along a lateral direction. In addition, the compressor 953 can be disposed in parallel with the condenser 952 in the lateral direction.

Specifically, the hot air flow channel 920 can extend from the front plate 410 toward the rear plate 420, and can be disposed close to one of the side plates 141 of the cabinet 100.

In some examples, as shown in FIG. 4, the hot air flow channel 920 can be disposed close to a first side plate 1411. However, the present disclosure may not be limited thereto. For example, the hot air flow channel 920 can be disposed close to a second side plate 1413. For convenience of description, the hot air flow channel 920 will be described as being disposed close to the first side plate 1411.

The water collector 170 and the compressor 953 can be disposed outside the hot air flow channel 920, and can be disposed close to the second side plate 1413 as the hot air flow channel 920 extends in a front and rear direction and is disposed close to the first side plate 1411.

The evaporator 951 and the condenser 952 can be disposed spaced apart from each other inside the hot air flow channel 920, and the water collector 170 can be disposed in parallel with the evaporator 951 to minimize a distance at which the condensed water is introduced from the evaporator 951. In addition, the compressor 953 can be disposed in parallel with the condenser 952 to minimize a distance at which the compressed refrigerant is supplied to the condenser 952.

In some examples, as shown in FIG. 4, as the hot air can be discharged from the front of the drum 200, the evaporator 951 can disposed forwardly of the condenser 952, and the water collector 170 can be disposed forwardly of the compressor 953. However, the present disclosure may not be limited thereto. For example, the arrangement of the evaporator 951 and the condenser 952 can be changed depending on the direction in which the hot air is discharged from the drum 200, and the arrangement of the water collector 170 and the compressor 9530 can also be changed responding thereto.

In some examples, referring back to FIG. 4, the rear plate 420 can include a duct 430.

The duct 430 can receive the hot air from the hot air supply 900 and guide the hot air into the drum 200.

The duct 430 can be recessed rearwards from one surface of the rear plate 420. As described above, the rear plate 420 can be located at the rear of the drum 200. The duct 430 can be recessed from one surface of the rear plate 420 to be away from the drum 200, and one surface of the rear plate 420 can be a front surface of the rear plate 420.

The duct 430 can be recessed rearwards from the front surface of the rear plate 420. That is, the duct 430 can have a flow space V through which the hot air can flow therein, and can have an open front surface.

From another point of view, the duct 430 can protrude rearwards from a rear surface of the rear plate 420, a front surface of the rearwardly protruding portion can be opened, and the flow space V can be defined as much as the portion protruding rearwards. In the flow space V, the hot air introduced from the hot air supply 900 can flow, and the hot air can be guided into the drum 200 from the rear of the drum 200.

Specifically, as the hot air is continuously supplied from the hot air supply 900 to the flow space V, the hot air can be diffused throughout the flow space V. As the hot air diffused throughout the flow space V flows into the drum 200 through the open front surface of the duct 430, an area in which the hot air is introduced can be maximized. Accordingly, the duct 430 can allow the hot air to be efficiently guided into the drum 200 through the flow space V.

In addition, the duct 430 can be connected to the hot air supply 900 through a fan duct 850. That is, the fan duct 850 can communicate the hot air supply 900 and the duct 430 with each other, so that the duct 430 can receive the hot air from the hot air supply 900. The fan duct 850 will be described later in detail.

FIGS. 5A to 5C are views showing an example of a rear plate of the laundry treating apparatus. Specifically, FIG. 5A is a perspective view of the rear plate, FIG. 5B is a front view of the rear plate, and FIG. 5C is a rear view of the rear plate.

Referring to FIG. 5A, the duct 430 can include a flow portion 431.

The flow portion 431 can guide the hot air introduced from the hot air supply 900 into the drum 200 through the drum rear surface 220 of the drum 200.

The flow portion 431 can be recessed rearwards from one surface of the rear plate 420 facing the drum rear surface 220. That is, the flow portion 431 can have a first flow space V1 defined therein through which the hot air can flow, and can have an open front surface. One surface of the rear plate 420 can be the front surface of the rear plate 420, and the aforementioned flow space V can include the first flow space V1.

In the flow portion 431, the hot air introduced from the fan duct 850 flows in the first flow space V1, and the hot air flowing in the first flow space V1 can be guided into the drum 200 through the drum rear surface 220.

The flow portion 431 can be formed in an annular shape. The above-mentioned annular shape can be understood that an extended shape forms a closed curve. Accordingly, the annular shape can be defined as a closed cross-section surrounded by the closed curve.

Specifically, the flow portion 431 can include a flow outer circumferential portion 4311 for surrounding the first flow space V1 in which the hot air flows from the outside. That is, the flow outer circumferential portion 4311 can correspond to an outer circumferential surface of the flow portion 431 in the state in which the flow portion 431 protrudes rearwards.

The flow portion 431 can include a flow inner circumferential portion 4312 surrounding the first flow space V1 in which the hot air flows from the inside. That is, the flow outer circumferential portion 4311 can correspond to an inner circumferential surface of the flow portion 431 in the state in which the flow portion 431 protrudes rearwards.

In addition, the flow portion 431 can include a flow recessed surface 4313 connecting the flow outer circumferential portion 4311 and the flow inner circumferential portion 4312 to each other. The flow recessed surface 4313 can correspond to one surface facing the drum rear surface 220.

The flow outer circumferential portion 4311 can be a portion extending rearwards from the front surface of the rear plate 420. Based on a radial direction of the flow portion 431, the flow inner circumferential portion 4312 can be located inwardly of the flow outer circumferential portion 4311, and can be a portion extending rearwards from the front surface of the rear plate 420. The flow recessed surface 4313 can be curved or extend parallel to the front surface of the rear plate 420, and can connect the flow outer circumferential portion 4311 and the flow inner circumferential portion 4312 to each other.

FIG. 5C shows the rear plate of FIGS. 5A and 5B viewed from the rear.

The flow outer circumferential portion 4311 can be a portion protruding rearwards from the rear surface of the rear plate 420. The flow inner circumferential portion 4312 can be located inwardly of the flow outer circumferential portion 4311, and can be a portion protruding rearwards from the rear surface of the rear plate 420. The flow recessed surface 4313 can be the portion connecting the flow outer circumferential portion 4311 and the flow inner circumferential portion 4312 to each other.

In some implementations, with reference to FIGS. 5A to 5C, the flow outer circumferential portion 4311 and the flow inner circumferential portion 4312 can be constructed such that boundary portions thereof with the front surface of the rear plate 420 are rounded. In addition, the flow outer circumferential portion 4311 and the flow inner circumferential portion 4312 can extend rearwards in parallel with each other, or can extend rearwards such that a distance therebetween decreases rearwardly. In FIGS. 5A to 5C, the flow outer circumferential portion 4311 and the flow inner circumferential portion 4312 are shown to be closer to each other rearwardly, but the present disclosure is not limited thereto. Furthermore, the flow recessed surface 4313 can be constructed such that portions thereof connected to the flow outer circumferential portion 4311 and the flow inner circumferential portion 4312 are rounded.

When viewed from the front with reference to FIG. 5B, the flow outer circumferential portion 4311 and the flow inner circumferential portion 4312 can be formed in a generally circular shape. For example, when a diameter of the flow outer circumferential portion 4311 is D1 and a diameter of the flow inner circumferential portion 1312 is D2, D1 can be greater than D2. The flow recessed surface 4313 can be an annular surface having an outer diameter of D1 and an inner diameter of D2. An overall shape of the flow portion 431 can be a donut shape. In some examples, the flow portion 431 can further include a flow protrusion 4315.

The flow protrusion 4315 can guide the hot air flowing through the first flow space V1 to the drum rear surface 220.

Specifically, the flow protrusion 4315 can protrude from the flow recessed surface 4313, and the flow protrusion 4315 can extend perpendicular to a direction in which the hot air flows. That is, the flow protrusion 4315 can extend between the flow outer circumferential portion 4311 and the flow inner circumferential portion 4312.

The flow protrusion 4315 can include a plurality of flow protrusions spaced apart from each other along a radial direction of flow portion 431. Accordingly, the hot air flowing through the first flow space V1 can be more efficiently guided to the drum rear surface 220.

Referring to FIG. 3 together, the driver M can be coupled to the rear surface of the rear plate 420 at a location inwardly of the flow inner circumferential portion 4312. That is, the flow inner circumferential portion 4312 can be constructed to surround the driver M to protect the driver M from external impact.

In some examples, referring back to FIGS. 2 and 3, the drum rear surface 220 can include a drum shielding portion 221 through which the hot air flows into the drum 200.

As described above, the drum rear surface 220 can face the flow portion 431, and can receive the hot air from the flow portion 431 and guide the hot air into the drum 200.

The drum shielding portion 221 can be disposed in front of the open front surface of the flow portion 431. The drum shielding portion 221 can shield the open front surface of the flow portion 431. That is, the drum shielding portion 221 can be disposed in front of the first flow space V1, and can shield the first flow space V1.

The drum shielding portion 221 can face the flow recessed surface 4313, and the hot air can flow between the drum shielding portion 221 and the flow recessed surface 4313. The drum shielding portion 221 can be formed in a shape corresponding to the flow portion 431 to more easily receive the hot air from the flow portion 431. That is, the drum shielding portion 221 can be formed in a donut shape.

In addition, the drum shielding portion 221 can include a drum inlet 2213 constructed such that the hot air can be introduced into the drum 200.

The drum inlet 2213 can be defined as a plurality of holes defined through the drum shielding portion 221 or can be defined as a net in a form of a mesh. In addition, a plurality of drum inlet 2213 can be defined to be spaced apart from each other in a circumferential direction of the drum shielding portion 221.

In addition, the drum shielding portion 221 can further include a reinforcing rib 2211 and a circumferential rib 2215 to secure structural rigidity.

In some examples, the reinforcing rib 2211 can be disposed between the two adjacent drum inlets 2213 along the circumferential direction of the drum shielding portion 221, and the circumferential rib 2215 can include circumferential ribs 2215 disposed inwardly of the reinforcing rib 2211 and inwardly of the drum inlet 2213. The circumferential rib 2215 can be formed in an annular shape, and can be formed integrally with the reinforcing rib 2211.

In addition, the reinforcing rib 2211 and the circumferential rib 2215 can be disposed relatively rearward as the drum inlet 2213 protrudes frontwards from the drum shielding portion 221, or can protrude rearwards from the drum shielding portion 221.

In addition, a portion of the drum rear surface 220 can be constructed to correspond to a mounting accommodating portion 451 to be described later. The drum rear surface 220 can include a drum accommodating portion 223 constructed to correspond to the mounting accommodating portion 451.

Specifically, the drum rear surface 220 can include a drum accommodating portion 223 that is recessed frontwards from an interior of the drum shielding portion 221. The drum accommodating portion 223 can accommodate the mounting accommodating portion 451 therein.

The drum accommodating portion 223 can be easy to be coupled with the drum rotating shaft 650 of the driver M penetrated the mounting hole 4513 as the mounting accommodating portion 451 is inserted thereinto. It can be easier to shield the open front surface of the flow portion 431 by allowing the drum shielding portion 221 to be disposed relatively close to the flow portion 431. Details of the mounting accommodating portion 451 will be described later.

Figure 6A:
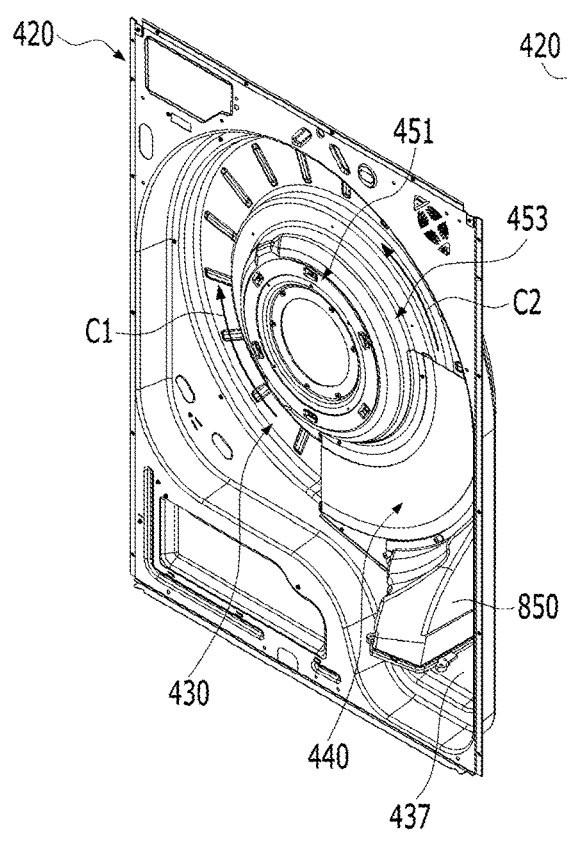
FIGS. 6A and 6B are views showing an example of the rear plate, a fan duct, and a duct plate.
Figure 6B:
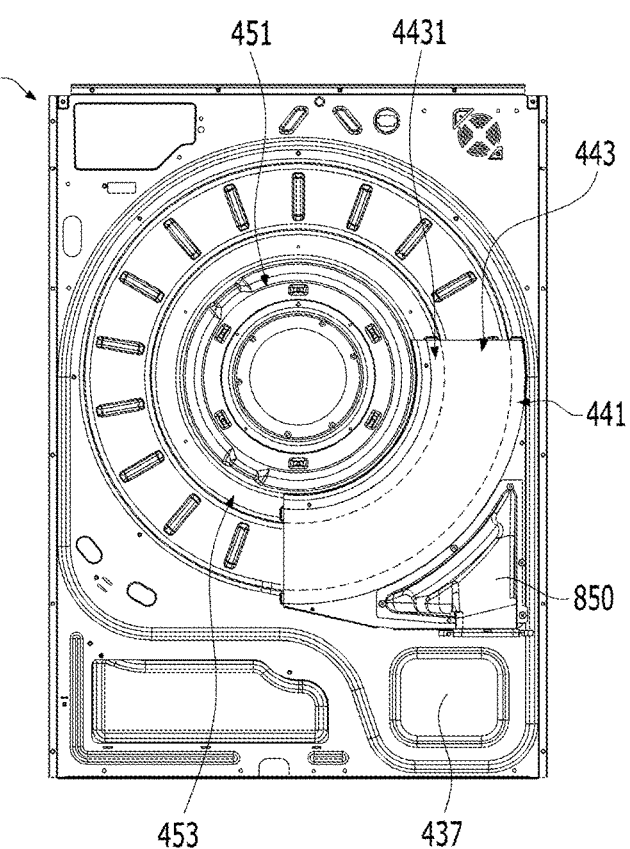

FIGS. 6A and 6B are views showing an example of a rear plate, a fan duct, and a duct plate. Specifically, FIG. 6A is a perspective view showing the rear plate to which the fan duct is coupled by the duct plate, and FIG. 6B is a front view of the rear plate to which the fan duct is coupled by the duct plate.

In some implementations, referring to FIGS. 5A to 6B, the duct 430 can further include an inlet 433 that can be connected to the fan duct 850.

The inlet 433 can be extended from the flow portion 431 such that the fan duct 850 can be disposed without interfering with the drum 200. That is, the inlet 433 can extend from the flow portion 431 in the radial direction of the flow portion 431, and can extend from the flow portion 431 toward the fan duct 850. The inlet 433 can have an open front surface that defines an inlet front surface open toward a rear surface of the drum.

That is, the inlet 433 can extend from one side of the flow portion 431 and be connected to the other side of the flow portion 431 via the fan duct 850. As described above, as the hot air supply 900 can be located below the drum 200 and the flow portion 431 can face the drum rear surface 220, the inlet 433 can extend downwards from one side of the flow portion 431.

In addition, as the hot air supply 900 is placed close to the first side plate 1411 of the side plates 141 of the cabinet 100, the inlet 433 can extend from one side of the flow portion 431 toward the first side plate 1411.

That is, the inlet 433 can extend in a diagonal direction from one side of the flow portion 431, and can extend to the other side of the flow portion 431 again. For example, as shown in FIGS. 5A to 5C, one side of the flow portion 431 can be a lower end of the flow portion 431, and the other side of the flow portion 431 can be a right end of the flow portion 431.

Specifically, the inlet 433 can be recessed rearwards from one surface of the rear plate 420 facing the fan duct 850. That is, the inlet 433 can be recessed to be away from the fan duct 850 from one surface of the rear plate 420 facing the fan duct 850. One surface of the rear plate 420 can be a front side of the rear plate 420.

The inlet 433 can have a second flow space V2 defined therein, and can have an open front surface, which is an inlet front surface that is open toward the drum. That is, the second flow space V2 can communicate with the first flow space V1 to define the aforementioned flow space V together. From another point of view, the second flow space V2 can be understood as first flow space V1 extending outwardly of the flow portion 431.

The fan duct 850 can be fixed by a duct plate 440 to be described later in front of the inlet 433, and the second flow space V2 can receive the hot air from the fan duct 850, and guide the hot air to the first flow space V1.

A size of the second flow space V2 can be sufficient when the fan duct 850 can be positioned in front and the hot air supplied from the fan duct 850 can be guided to the first flow space V1 while minimizing a flow loss thereof. That is, a size of the inlet 433 can be variously set based on a shape of the fan duct 850, a size of the fan duct 850, a shape of the flow portion 431, and the like.

More specifically, the inlet 433 can include an inlet circumferential portion 4331 that forms a circumference of the inlet 433. The inlet circumferential portion 4331 can be connected to the flow outer circumferential portion 4311, and can form an outer circumference of the second flow space V2.

The inlet circumferential portion 4331 can extend from one side of the flow outer circumferential portion 4311 to the other side of the flow outer circumferential portion 4311 via the fan duct 850. In addition, the inlet 433 can be in communication with the flow portion 431 as one side and the other side of the flow outer circumferential portion 4311 are opened. That is, the flow outer circumferential portion 4311 can be formed in a shape of a partially open circle, that is, in a shape of an arc, rather than forming a perfect circle shape. The inlet circumferential portion 4331 can form a continuous circumference with the flow outer circumferential portion 4311 from one side to the other side of the flow outer circumferential portion 4311. One side of the flow outer circumferential portion 4311 described above can be understood as the same meaning as said one side of the flow portion 431, and the other side of the flow outer circumferential portion 4311 can be understood as the same meaning as the other side of the flow portion 431.

In addition, the inlet 433 can include an inlet recessed surface 4333 for connecting one side and the other side of the inlet circumferential portion 4331 to each other. The inlet recessed surface 4333 can refer to a recessed surface of the inlet 433, and can shield the inlet circumferential portion 4331 to define the second flow space V2 together with the inlet circumferential portion 4331.

The inlet recessed surface 4333 can be connected to the flow recessed surface 4313 of the flow portion 431, and can form one continuous surface with the flow recessed surface 4313. That is, a portion of a circumference of the inlet recessed surface 4333 can be surrounded by the inlet circumferential portion 4331, and the inlet recessed surface 4333 can be connected to the flow recessed surface 4313 in a region excluding the inlet circumferential portion 4331.

In some examples, referring to FIG. 5B again, the flow portion 431 and the inlet 433 can be integrally formed. The inlet recessed surface 4333 can form one continuous surface of the duct 430 with the flow recessed surface 4313, and the flow outer circumferential portion 4311 can form a continuous circumference of the duct 430 of the same depth as the inlet circumferential portion 4331. As the flow portion 431 and the inlet 433 are integrally manufactured, manufacturing convenience can be increased.

In addition, the rear plate 420 can be formed integrally with the duct 430. That is, the duct 430 can be formed by pressing a front surface of the rear plate 420 rearwardly. Accordingly, leakage of the hot air through a gap between the duct 430 and the rear plate 420 that can occur when the duct 430 is separately formed and attached to the rear plate 420 can be prevented. In addition, the manufacturing convenience of the rear plate 420 can be increased.

That is, as the inlet 433 and the flow portion 431 are integrally manufactured and the rear plate 420 and the duct 430 are integrally manufactured, the leakage can be prevented as much as possible in the rear plate 420.

In some examples, referring to FIGS. 5A to 6B again, the rear plate 420 can include a mounting portion 450 to which the driver M is coupled and seated.

The mounting portion 450 can be disposed inwardly of the flow portion 431, and can be surrounded by the flow portion 431.

Specifically, the mounting portion 450 can include a mounting accommodating portion 451 to which the driver M is coupled, and a mounting circumferential portion 453 surrounding a mounting accommodating portion 451 and connected with a flow inner circumferential portion 4312.

The mounting accommodating portion 451 can be disposed at a center of the mounting portion 450, and can protrude forwardly of the mounting circumferential portion 453, so that the driver M can be accommodated into and coupled to the mounting accommodating portion 451.

Specifically, the mounting accommodating portion 451 can include a mounting surface 4511 to which the driver M is coupled and a mounting hole 4513 penetrating the mounting surface 4511, and the driver M can be connected to the drum rear surface 220 through the mounting hole 4513. The mounting surface 4511 and the mounting hole 4513 can allow the driver M to be easily connected to the drum rear surface 220 and can support the driver M.

For example, the mounting hole 4513 can be defined in a circular shape at a center of the mounting surface 4511, and the mounting surface 4511 can be formed in an annular shape by the mounting hole 4513.

The mounting circumferential portion 453 can connect the mounting accommodating portion 451 and the flow inner circumferential portion 4312 to each other, and can provide a separation distance between the flow inner circumferential portion 4312 and the driver M coupled to the mounting accommodating portion 451.

In some examples, the mounting accommodating portion 451 can include a mounting connecting portion 4512 extending rearwards from mounting surface 4511 and connected with the mounting circumferential portion 453.

The mounting connecting portion 4512 can face an outer circumferential surface of the driver M, and can be prevented from being in contact with the driver M.

Specifically, the mounting connecting portion 4512 can be extended to increase in diameter rearwardly from the mounting surface 4511. The mounting connecting portion 4512 can protect the driver M from external impact, and can be prevented as much as possible from being in contact with the driver M.

In summary, with respect to the mounting surface 4511, the mounting connecting portion 4512 can be connected from a radially outer side of the mounting portion 450, the mounting circumferential portion 453 can be connected from a radially outer side of the mounting connecting portion 4512, and the flow inner circumferential portion 4312 can be connected from a radially outer side of the mounting circumferential portion 453.

Figures 7A, 7B:
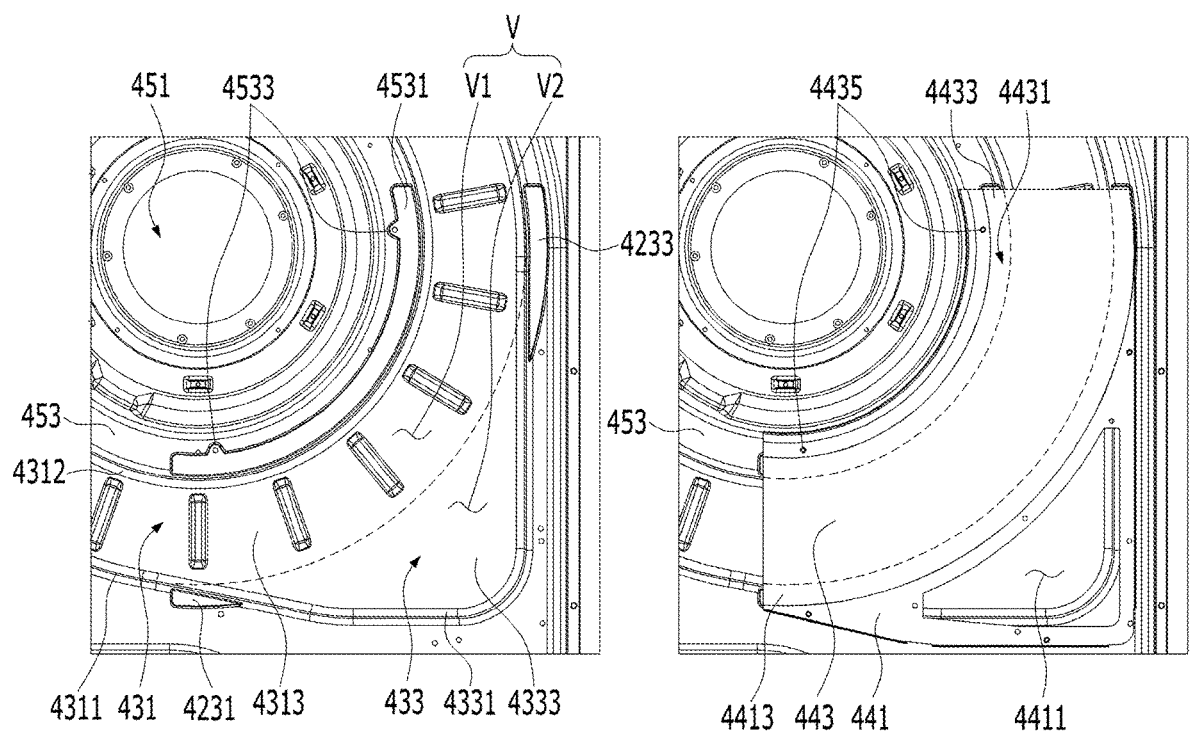
FIGS. 7A and 7B are views showing the rear plate and the duct plate.

FIGS. 7A and 7B are views showing an example of a rear plate and a duct plate. Specifically, FIG. 7A shows the rear plate from which the duct plate is separated, and FIG. 7B shows the rear plate to which the duct plate is coupled.

In some implementations, referring to FIGS. 7A and 7B, the laundry treating apparatus 10 can include the duct plate 440.

The duct plate 440 can shield the open front surface of the inlet 433, and can be coupled with the fan duct 850 to be in communication with an interior of the inlet 433. That is, the duct plate 440 can fix the fan duct 850 in front of the inlet 433, and the hot air flowing inside the fan duct 850 can be stably guided into the inlet 433.

Specifically, the duct plate 440 can include an inlet shielding portion 441. The inlet shielding portion 441 can shield the entire open front surface of the inlet 433 to prevent the hot air guided from the inlet 433 to the flow portion 431 from leaking.

The inlet shielding portion 441 can face the inlet recessed surface 4333 of the inlet 433, and a portion of the inlet shielding portion 441 facing the inlet recessed surface 4333 can be penetrated to guide the hot air from the fan duct 850 into the inlet 433.

In some implementations, the inlet shielding portion 441 can shield the entire open front surface of the inlet 433 such that the entire open front surface of the inlet 433 is shielded together with the fan duct 850 as the fan duct 850 is coupled thereto. That is, the inlet shielding portion 441 can face an entirety of the inlet recessed surface 4333 excluding a region in which the fan duct 850 is disposed.

The inlet shielding portion 441 can be coupled to one surface of the rear plate 420 by extending outwardly of the circumference of the inlet 433. One surface of the rear plate 420 can be the front surface of the rear plate 420.

The inlet shielding portion 441 can extend outwardly of the circumference of the inlet 433 to more easily shield the open front surface of the inlet 433, and can be in contact with one surface of the rear plate 420 to increase a coupling area. In some examples, the inlet shielding portion 441 can extend outwardly of the circumference of the inlet 433 such that the inlet shielding portion 441 extends outwardly of the inlet circumferential portion 4331 of the inlet 433.

The inlet shielding portion 441 can extend in consideration of an arrangement with other components. For example, the inlet 433 can be disposed close to the first side plate 1411 among the side plates 141, and the inlet shielding portion 441 can be prevented from being in contact with the first side plate 1411 as a portion thereof facing the first side plate 1411 extends in parallel with the first side plate 1411.

In addition, a length extending outwardly of the inlet circumferential portion 4331 of the inlet shielding portion 441 can be set to a length that can effectively prevent the hot air flowed into the second flow space V2 from leaking between the inlet shielding portion 441 and the inlet circumferential portion 4331 rather than flowing into the first flow space V1.

In addition, a coupling scheme of the inlet shielding portion 441 and one surface of the rear plate 420 can be variously set. As the coupling scheme, various schemes such as screw coupling, rivet coupling, fitting coupling, and the like can be used.

For example, as shown in FIGS. 7A and 7B, the inlet shielding portion 441 can be fixed to one surface of the rear plate 420, where a separate fastening member passes through the inlet shielding portion 441 and one surface of the rear plate 420 together. The inlet shielding portion 441 can extend outwardly of the inlet circumferential portion 4331, so that, as shown in FIGS. 7A and 7B, even when the inlet shielding portion 441 is fixed to one surface of the rear plate 420 through the separate fastening member, interference between the separate fastening member and the second flow space V2 can be prevented.

In some examples, referring to FIGS. 7A and 7B again, the duct plate 440 can include a flow portion shielding portion 443.

The flow portion shielding portion 443 can extend from the inlet shielding portion 441 toward the flow portion 431 to shield a portion of the open front surface of the flow portion 431. Accordingly, the flow portion shielding portion 443 can prevent a flow loss resulted from decompression of the hot air flowing from the inlet 433 into the flow portion 431. In addition, the flow portion shielding portion 443 can prevent the hot air from being concentrated to the drum rear surface 220 adjacent to the inlet 433.

The flow portion shielding portion 443 and the inlet shielding portion 441 are defined for convenience of description. For example, the inlet shielding portion 441 can refer to a portion shielding the open front surface of the inlet 433 of the duct plate 440 and extending to an outer circumference of the flow portion 431. The flow portion shielding portion 443 can refer to a portion shielding the open front surface of the flow portion 431 of the duct plate 440 and extending to the outer circumference of the flow portion 431.

That is, the inlet shielding portion 441 can be a portion extending from an exterior of the flow portion 431 to the flow outer circumferential portion 4311, the flow portion shielding portion 443 can be a portion extending from an interior of the flow portion 431 to the flow outer circumferential portion 4311, and the inlet shielding portion 441 and the flow portion shielding portion 443 can be partitioned by the flow outer circumferential portion 4311.

Specifically, the flow portion shielding portion 443 can extend from the inlet shielding portion 441 toward the flow inner circumferential portion 4312 of the flow portion 431. The flow portion shielding portion 443 can extend from the inlet shielding portion 441 to the flow inner circumferential portion 4312 to shield an entirety space defined between the flow outer circumferential portion 4311 and the flow inner circumferential portion 4312. In addition, the flow portion shielding portion 443 can extend toward the flow inner circumferential portion 4312 such that a space where the hot air can be discharged is defined between the flow portion shielding portion 443 and the flow inner circumferential portion 4312.

For example, as shown in FIG. 7B, the flow portion shielding portion 443 can extend from the inlet shielding portion 441 to the flow inner circumferential portion 4312. However, the present disclosure may not be limited thereto. For instance, the extension of the flow portion shielding portion 443 can be determined in consideration of a shape of the flow portion 431, a shape of the inlet 433, a flow area of the hot air of the flow portion 431, a flow area of the hot air of the inlet 433, and the like.

In some implementations, the flow portion shielding portion 443 can have a greater width in a circumferential direction of the flow portion 431 than the inlet 433. That is, the flow portion shielding portion 443 can extend further than the inlet 433 along the circumferential direction of the flow portion 431 at a boundary between the flow portion 431 and the inlet 433, and the hot air introduced into the flow portion 431 from the inlet 433 can be guided to the drum rear surface 220 after flowing through the flow portion 431 over a certain time.

Accordingly, the flow portion shielding portion 443 can more effectively prevent the flow loss of the hot air resulted from the decompression that occurs when the hot air is introduced into the second flow space V2 from the first flow space V1. In addition, the flow portion shielding portion 443 can prevent the concentration of the hot air to the drum rear surface 220 adjacent to the inlet 433, and can guide the hot air in a balanced manner to the entire drum rear surface 220 to improve drying efficiency.

From another point of view, the flow portion shielding portion 443 can further extend from the boundary between the flow portion 431 and the inlet 433 in one direction C1 or the other direction C2. As described above, the flow portion 431 can be formed in the annular shape, and the hot air introduced from the inlet 433 can flow inside the flow portion 431 in one direction C1 and the other direction C2. One direction C1 can refer to a clockwise direction, and the other direction C2 can refer to a counterclockwise direction.

Amounts of hot air flowing into the flow portion 431 from the inlet 433 can be different in one direction C1 and the other direction C2 depending on the shape of the fan duct 850, the shape of the inlet 433, and the like, and the flow portion shielding portion 443 can extend or can extend relatively further in a direction in which a relatively large amount of hot air is guided among one direction C1 and the other direction C2. Accordingly, the flow portion shielding portion 443 can more effectively prevent the flow loss resulted from the decompression of the hot air flowing from the first flow space V1 into the second flow space V2, and can guide the hot air in the balanced manner to the entire drum rear surface 220 to improve the drying efficiency.

In some examples, when the amounts of hot air flowing into the flow portion 431 from the inlet 433 in one direction C1 and the other direction C2 are the same, degrees of extension in one direction C1 and the other direction C2 of the flow portion shielding portion 443 can be the same at the boundary between the flow portion 431 and the inlet 433. The guided amounts being the same described above may not mean that the amounts are physically the same, but can mean that there is no significant difference in the amount of hot air to such an extent that the drying efficiency is not affected.

For example, as shown in FIG. 7B, the degrees of extension in one direction C1 and the other direction C2 of the flow portion shielding portion 443 can be the same at the boundary between the flow portion 431 and the inlet 433.

In some examples, the flow portion shielding portion 443 can be manufactured integrally with the inlet shielding portion 441. That is, the duct plate 440 can be formed as a single plate, and can be divided into the flow portion shielding portion 443 and the inlet shielding portion 441 based on functions and roles.

The flow portion shielding portion 443 can be manufactured integrally with the inlet shielding portion 441, so that it can be easy to manufacture and manage the duct plate 440. When the flow portion shielding portion 443 and the inlet shielding portion 441 are separately manufactured and coupled to each other, it is possible to prevent the leakage of the hot air that can occur between the flow portion shielding portion 443 and the inlet shielding portion 441.

In addition, the flow portion shielding portion 443 can be connected to the inlet shielding portion 441 at a location outward of the perimeter of the inlet 433.

As described above, the inlet shielding portion 441 can extend outwardly of the circumference of the inlet 433, and the flow portion shielding portion 443 can extend in one direction C1 and the other direction C2 at the boundary between the flow portion 431 and the inlet 433.

The flow portion shielding portion 443 can have one end directed in one direction C1 that extends in a continuous line with one end of the inlet shielding portion 441 directed in the one direction C1, and can have the other end directed in the other direction C2 that also extends in a continuous line with the other end of the inlet shielding portion 441 directed in the other direction C2.

That is, as the both ends of the flow portion shielding portion 443 respectively extend in the continuous line with the both ends of the inlet shielding portion 441, the manufacture convenience of the duct plate 440 can be increased.

For example, as shown in FIG. 7B, the flow portion shielding portion 443 can have a shape of an arc, and the both ends of the inlet shielding portion 441 can define the continuous straight lines while respectively extending away from the both ends of the flow portion shielding portion 443 in a radial direction of the flow portion 431. That is, the duct plate 440, which includes the flow portion shielding portion 443 and the inlet shielding portion 441, can have one end parallel to the second side plate 1413 and the other end parallel to the top plate 145.

Figure 8:
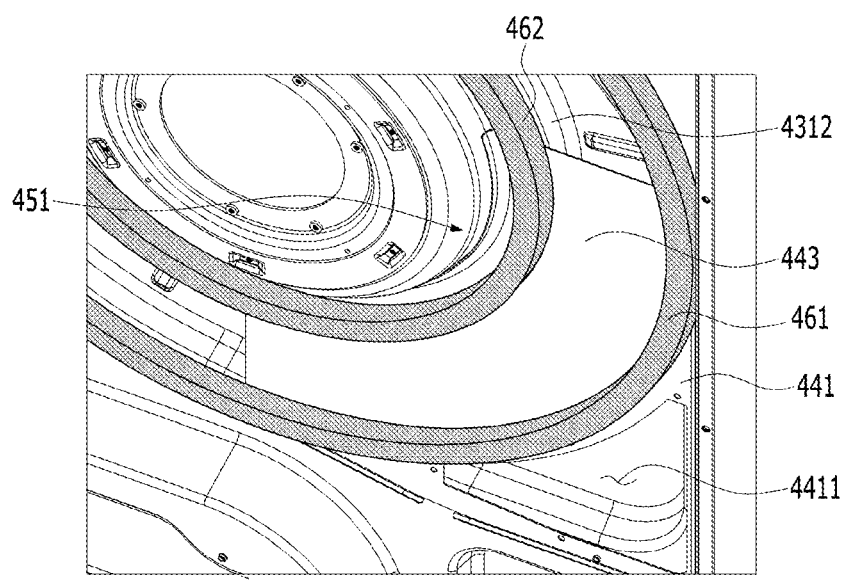
FIG. 8 is an enlarged view showing the duct plate coupled to the rear plate.

In some examples, FIG. 8 is an enlarged view of a duct plate coupled to a rear plate.

Referring to FIG. 8, the flow portion shielding portion 443 can include a flow portion coupling portion 4431. The flow portion coupling portion 4431 can be coupled to the mounting portion 450 to provide a fixing force to the flow portion shielding portion 443.

The flow portion coupling portion 4431 can extend toward the driver M coupled to the center of the mounting portion 450, and can be coupled with the mounting portion 450 from the front of the mounting portion 450. That is, the flow portion coupling portion 4431 can be a portion disposed inwardly of the flow inner circumferential portion 4312 of the flow portion 431 of the flow portion shielding portion 443.

Specifically, the flow portion coupling portion 4431 can extend along a circumference of the mounting portion 450, and an area thereof in contact with the mounting portion 450 can be equal to or greater than a predetermined area. Accordingly, the flow portion coupling portion 4431 can receive sufficient supporting force and coupling force by the mounting portion 450.

More specifically, the flow portion coupling portion 4431 can extend to the mounting accommodating portion 451 of the mounting portion 450, so that the flow portion coupling portion 4431 can be in contact with an entirety of the mounting circumferential portion 453 between an outer circumference and an inner circumference of the mounting circumferential portion 453 at a certain portion.

That is, the flow portion coupling portion 4431 can receive a supporting force from the mounting circumferential portion 453 as much as possible, and can have a sufficient extending length to prevent the leakage of the hot air flowing inside the flow portion 431 between the mounting circumferential portion 453 and the flow portion coupling portion 4431 as much as possible. For example, when the mounting circumferential portion 453 is formed in the annular shape, the flow portion coupling portion 4431 can be formed in a shape of an arc forming a portion of the annular shape of the mounting circumferential portion 453.

In addition, the flow portion coupling portion 4431 can be constructed such that an end thereof protrudes frontwards as the mounting accommodating portion 451 protrudes forwardly of the flow portion 431 so as to be in contact with a circumference of the mounting accommodating portion 451. The circumference of the mounting accommodating portion 451 can be the mounting connecting portion 4512 described above.

The end of the flow portion coupling portion 4431 can receive the supporting force in contact with the circumference of the mounting accommodating portion 451, and can serve as a guider during the coupling of the duct plate 440. A protrusion length of the end of the flow portion coupling portion 4431 can be variously set in consideration of a protrusion degree of the mounting accommodating portion 451, the shape of the flow portion coupling portion 4431, a material of the flow portion coupling portion 4431, and the like.

Figures 9A, 9B:
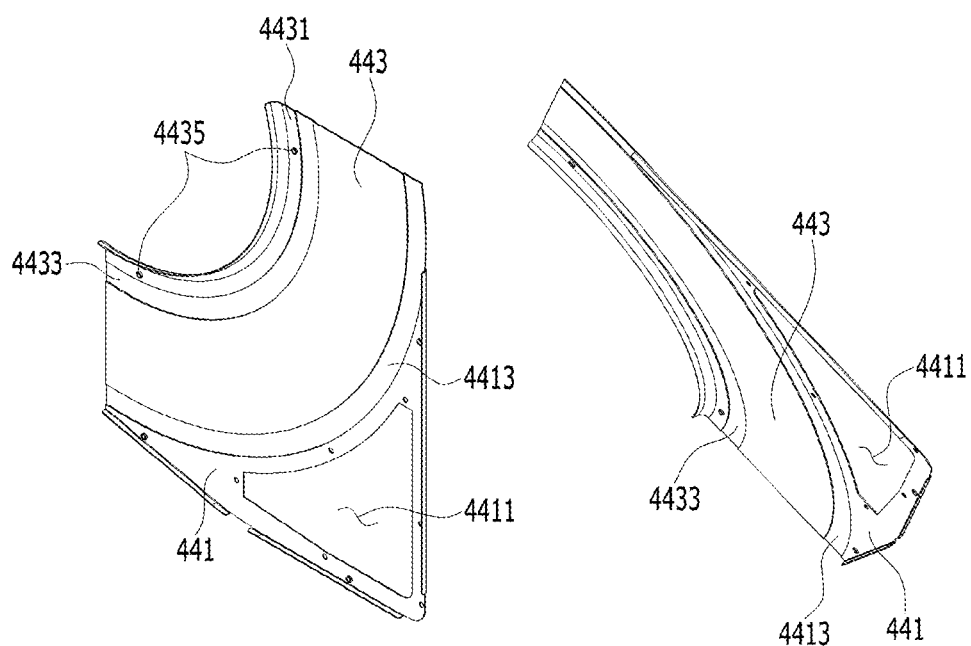
FIGS. 9A and 9B are views showing the duct plate.

FIGS. 9A and 9B are views showing an example of the duct plate. Specifically, FIG. 9A is a front perspective view of the duct plate, and FIG. 9B is a rear perspective view of the duct plate.

Referring to FIGS. 9A and 9B, the flow portion shielding portion 443 can include a flow portion support 4433. The flow portion support 4433 can protrude rearwards from the flow portion shielding portion 443 to secure rigidity of the flow portion shielding portion 443.

The flow portion support 4433 can be formed in a specific portion of the flow portion shielding portion 443. That is, the flow portion support 4433 can be disposed in front of the mounting portion 450, can be disposed in front of the flow portion 431, and can be disposed in front of the boundary between the mounting portion 450 and the flow portion 431. The position at which the flow portion support 4433 is disposed can be determined in consideration of the shape of the flow portion 431, the shape of the mounting portion 450, and the like.

In addition, the flow portion support 4433 can extend from one end directed in the one direction C1 of the flow portion shielding portion 443 to the other end thereof directed in the other direction C2. The flow portion shielding portion 443 can be formed in the shape of the arc, and the flow portion support 4433 can be formed in a shape of an arc corresponding thereto.

That is, the flow portion support 4433 can be constructed to extend throughout the entire flow portion shielding portion 443 in the circumferential direction of the flow portion 431, so that the flow portion support 4433 can be easily manufactured. In addition, the flow portion support 4433 can allow the overall shape of the flow portion shielding portion 443 to be stepped in the radial direction of the flow portion 431, so that structural rigidity thereof can be further increased.

In some examples, the flow portion support 4433 can be disposed on the flow portion coupling portion 4431. That is, the flow portion support 4433 can be disposed on the flow portion coupling portion 4431 to be prevented from interfering with the first flow space V1 of the flow portion 431, and occurrence of a flow resistance of the hot air flowing through the first flow space V1 can be prevented in advance depending on the shape of the flow portion support 4433.

Referring back to FIGS. 7A and 7B, the mounting portion 450 can include a mounting support 4531 recessed from the mounting circumferential portion 453 in a shape corresponding to the flow portion support 4433.

Specifically, the mounting support 4531 can be disposed at a portion where the mounting circumferential portion 453 and the flow portion 431 are connected to each other. That is, the mounting support 4531 can be disposed on the outermost side in the radial direction from the center of the mounting portion 450, so that the manufacturing convenience can be increased.

In addition, the mounting support 4531 can have a portion to be connected to the flow inner circumferential portion 4312 of the flow portion 431 that can be opened in the radial direction of the mounting portion 450, so that the mounting support 4531 can be easily coupled to the flow portion support 4433. That is, a portion of the mounting support 4531 to be connected to the flow inner circumferential portion 4312 of a circumference surrounding a surface for accommodating the flow portion support 4433 thereon can be opened. From another point of view, a portion of the flow inner circumferential portion 4312 connected to the mounting support 4531 can protrude frontwards less than other portions of the flow inner circumferential portion 4312.

In some examples, the flow portion support 4433 can be disposed at a position corresponding to the mounting support 4531 to be accommodated in the mounting support 4531, and can form the mounting circumferential portion 453. The corresponding position can be a portion in which the flow portion coupling portion 4431 and a portion for shielding the open front surface of the flow portion 431 of the flow portion shielding portion 443 are connected to each other.

The flow portion support 4433 can prevent the flow portion 431 from interfering with a flow path of the hot air flowing through the first flow space V1 as one surface thereof facing the flow portion 431 can form one continuous surface with the flow inner circumferential portion 4312.

The flow portion support 4433 can prevent the flow portion support 4433 from protruding forwardly of the mounting circumferential portion 453 to prevent contact with the drum 200 as one surface thereof facing the drum 200 can form one continuous surface with the mounting circumferential portion 453.

The fact that one surface of the flow portion support 4433 facing the flow portion 431 forms one continuous surface with the flow inner circumferential portion 4312, and one surface of the flow portion support 4433 facing the drum 200 forms one continuous surface with the mounting circumferential portion 453 may not mean one continuous surface in a physical sense. In other words, one continuous surface can be defined taking into account a tolerance and an error resulted from the manufacturing.

The flow portion support 4433 can be in contact with an accommodated surface of the mounting support 4531 and a circumference surrounding the accommodated surface, and an area of the flow portion support 4433 supported by the mounting support 4531 can be maximized to provide strong supporting and coupling forces.

In some examples, referring to FIGS. 7A to 9B, the flow portion coupling portion 4431 can include a flow portion coupling hole 4435. In addition, the mounting portion 450 can include a mounting portion coupling portion 4533 disposed at a position corresponding to the flow portion coupling hole 4435.

A separate fastening member can pass through the flow portion coupling hole 4435 and the mounting portion coupling portion 4533 to fix the flow portion shielding portion 443 to the mounting portion 450. As an inner sealing portion 462 to be described later can be disposed along the outer circumference of the mounting circumferential portion 453 and the flow portion support 4433, the flow portion coupling hole 4435 can be defined inwardly of the flow portion coupling portion 4431 than the flow portion support 4433 to prevent interference with the inner sealing portion 462. That is, the flow portion coupling hole 4435 can be defined closer to the mounting accommodating portion 451 than the flow portion coupling portion 4431.

The mounting portion coupling portion 4533 can be disposed at a position corresponding to the flow portion coupling hole 4435. Specifically, the mounting portion coupling portion 4533 can be disposed inwardly of the mounting circumferential portion 453 than the mounting support 4531. That is, the mounting portion coupling portion 4533 can be disposed closer to the mounting accommodating portion 451 than the flow portion coupling hole 4435, and can have a hole defined therein through which the separate coupling member passes together with the flow portion coupling hole 4435.

In addition, the mounting portion coupling portion 4533 can be formed in a shape of being recessed form the mounting circumferential portion 453, and can be connected with a mounting support 4531. That is, the mounting portion coupling portion 4533 can be connected to the mounting support 4531 and can be recessed to have the same depth. Accordingly, when the separate fastening member passes through and is coupled to the mounting portion coupling portion 4533, the mounting portion coupling portion 4533 can prevent the separate fastening member from protruding frontwards, and can serve as a guider during the coupling.

The flow portion coupling hole 4435 and the mounting portion coupling portion 4533 can respectively include a plurality of flow portion coupling holes and a plurality of mounting portion coupling portions. The flow portion coupling holes 4435 can be spaced apart from each other in a circumferential direction of the flow portion coupling portion 4431, and the mounting portion coupling portions 4533 can also be spaced apart from each other in a circumferential direction of the mounting circumferential portion 453.

Specifically, as described above, the flow portion support 4433 can extend between one end and the other end of the flow portion coupling portion 4431 in the shape of the arc, and the plurality of flow portion coupling holes 4435 can be defined to be spaced apart from each other along an inner circumference of the flow portion support 4433. In addition, the mounting support 4531 can have the shape of the arc and have a length in the circumferential direction corresponding to that of the flow portion support 4433, and the plurality of mounting portion coupling portions 4533 can be spaced apart from each other along an inner circumference of the mounting support 4531.

In some examples, as shown in FIG. 7A, two flow portion coupling holes 4435 and two mounting portion coupling portions 4533 can be provided. For instance, one flow portion coupling hole 4435 and one mounting portion coupling portion 4533 can be located close to one end of the flow portion coupling portion 4431. The other flow portion coupling hole 4435 and the other mounting portion coupling portion 4533 can be located close to the other end of the flow portion coupling portion 4431. However, the present disclosure may not be construed as being limited thereto. For example, the numbers and separation distances of the flow portion coupling holes 4435 and the mounting portion coupling portions 4533 can be variously set in consideration of the length in the circumferential direction of the flow portion support 4433, the length in the circumferential direction of the mounting support 4531, a coupling force, and the like.

In some examples, referring to FIGS. 8 to 9B, the duct plate 440 can include an inlet support 4413.

The inlet support 4413 can be spaced apart from the flow portion support 4433 and protrude rearwards from the duct plate 440. That is, the inlet support 4413 can increase the rigidity of the duct plate 440 together with the flow portion support 4433.

As described above, the flow portion support 4433 can be disposed in the flow portion shielding portion 443, and the inlet support 4413 can be disposed in the inlet shielding portion 441 or disposed at the boundary between the flow portion shielding portion 443 and the inlet shielding portion 441 to increase the overall rigidity of the duct plate 440.

Because the plate inlet 4411 of the inlet shielding portion 441 is defined by being penetrated, the inlet support 4413 can be spaced apart from the plate inlet 4411 for easy manufacturing and for securing overall rigidity. That is, the inlet support 4413 can be disposed at the boundary between the flow portion shielding portion 443 and the inlet shielding portion 441 to sufficiently secure a separation distance from the plate inlet 4411 of the inlet shielding portion 441.

In addition, the inlet support 4413 can extend from one end of the duct plate 440 directed in one direction C1 to the other end of the duct plate 440 directed in the other direction C2. That is, the inlet support 4413 can be disposed throughout the boundary between the flow portion shielding portion 443 and the inlet shielding portion 441 along the circumferential direction of the duct plate 440, which can be more advantageous in securing structural rigidity. From another point of view, the inlet support 4413 can be disposed at the boundary between the flow portion shielding portion 443 and the inlet shielding portion 441 to extend along the boundary.

In some examples, with reference to FIGS. 7A and 7B, an end of the inlet support 4413 can be disposed outwardly of the inlet 433, and the rear plate 420 can further include an inlet support coupling portion 423 that is recessed into a shape corresponding to that of the end of the inlet support 4413. The inlet support 4413 can have a shape of protruding rearwards and can be accommodated in the inlet support coupling portion 423 to increase a contact area, thereby receiving sufficient supporting force.

Specifically, the inlet support 4413 can have one end directed in one direction C1 and the other end directed in the other direction C2 both disposed outwardly of the inlet 433. Correspondingly, the inlet support coupling portion 423 can include a first inlet support coupling portion 4231 for accommodating one end of the inlet support 4413 therein, and a second inlet support coupling portion 4233 for accommodating the other end of the inlet support 4413 therein.

The first inlet support coupling portion 4231 can be recessed rearwardly from one surface of the rear plate 420 located on one side of the flow portion 431 connected to the inlet 433 described above. That is, the first inlet support coupling portion 4231 can be connected to both the flow outer circumferential portion 4311 and the inlet circumferential portion 4331, and can easily accommodate therein one end of the inlet support 4413 that is recessed rearwards at the boundary between the inlet shielding portion 441 and the flow portion shielding portion 443.

In addition, the second inlet support coupling portion 4233 can be recessed rearwards from one surface of the rear plate 420 located on the other side of the flow portion 431 to which the inlet 433 is connected. That is, the second inlet support coupling portion 4233 can be connected to both the flow outer circumferential portion 4311 and the inlet circumferential portion 4331, and can easily accommodate therein the other end of the inlet support 4413 that is recessed rearwards at the boundary between the inlet shielding portion 441 and the flow portion shielding portion 443.

For example, as shown in FIG. 7A, the first inlet support coupling portion 4231 can be disposed in a portion in which the end of the flow portion 431 facing the bottom plate 147 and the end of the inlet 433 positioned far from the first side plate 1411 are in contact with each other. The second inlet support coupling portion 4233 can be disposed in a portion in which the end of the flow portion 431 facing the first side plate 1411 and the end of the inlet 433 positioned close to the first side plate 1411 are in contact with each other.

Shapes of the first inlet support coupling portion 4231 and the second inlet support coupling portion 4233 can correspond to the both ends of the inlet support 4413 extending outwardly of the inlet circumferential portion 4331 of the inlet 433, respectively. Conversely, the shapes of the first inlet support coupling portion 4231 and the second inlet support coupling portion 4233 can be determined, and the both ends of the inlet support 4413 can be formed to correspond to the shapes of the first inlet support coupling portion 4231 and the second inlet support coupling portion 4233.

In some examples, an extension length in one direction of the first inlet support coupling portion 4231 and an extension length in the other direction of the second inlet support coupling portion 4233 can be set variously in consideration of arrangements relationship with other components, the shape of the duct plate 440, the material of the rear plate 420, and the like. For example, as shown in FIGS. 7A and 7B, the extension length in the other direction of the second inlet support coupling portion 4233 can be greater than the extension length in one direction of the first inlet support coupling portion 4231.

In some examples, referring to FIG. 8 again, the laundry treating apparatus can include a sealing portion 460 that prevents the leakage of the hot air to the outside of the drum 200.

The sealing portion 460 can prevent the hot air introduced through the drum inlet 2213 of the drum 200 from the first flow space V1 of the flow portion 431 from leaking to a portion other than the drum inlet 2213. Specifically, the sealing portion 460 can include an inner sealing portion 462 and an outer sealing portion 461.

The inner sealing portion 462 can extend in an annular shape along the inner circumference of the flow portion 431, and can be disposed in front of the rear plate 420. That is, the inner sealing portion 462 can extend in the annular shape along the flow inner circumferential portion 4312 of the flow portion 431, can be disposed in the mounting circumferential portion 453, and can prevent the hot air guided to the drum inlet 2213 from the first flow space V1 from flowing into the mounting portion 450.

The inner sealing portion 462 can be disposed at the portion where the mounting circumferential portion 453 and the flow inner circumferential portion 4312 are connected to each other to prevent the hot air of the first flow space V1 from flowing into the mounting portion 450 and allow the hot air of the first flow space V1 to be more efficiently guided to the drum inlet 2213.

In addition, a portion of a circumference of the inner sealing portion 462 can be disposed on the flow portion support 4433, the remaining portion of the circumference can be disposed on the mounting circumferential portion 453. The portion of the circumference of the inner sealing portion 462 disposed on the flow portion support 4433 can be supported by the flow portion support 4433, so that a fixing force of the position can be increased. Furthermore, the inner sealing portion 462 can be in contact with both the drum rear surface 220 and the mounting circumferential portion 453 to prevent the leakage more effectively.

The outer sealing portion 461 can extend in an annular shape along the outer circumference of the flow portion 431, and can be disposed in front of the rear plate 420. That is, the outer sealing portion 461 can extend in the annular shape along the flow outer circumferential portion 4311 of the flow portion 431, can be disposed on one surface of the rear plate 420, and can prevent the hot air guided to the drum inlet 2213 from the first flow space V1 from flowing to a space between the drum rear surface 220 and the flow outer circumferential portion 4311. Said one surface of the rear plate 420 can be the front surface of the rear plate 420.

The outer sealing portion 461 can be disposed at the portion where the flow outer circumferential portion 4311 and said one surface of the rear plate 420 are connected to each other to prevent the hot air of the first flow space V1 from leaking outwardly of the O| flow outer circumferential portion 4311 and allow the hot air of the first flow space V1 to be more efficiently guided to the drum inlet 2213. Furthermore, the outer sealing portion 461 can be in contact with both the drum rear surface 220 and said one surface of the rear plate 420 to more effectively prevent the leakage.

In some examples, because the drum 200 rotates in the operation process of the treating apparatus, constant friction is applied to the sealing portion 460 by the drum rear surface 220. Therefore, the sealing portion 460 can be made of an elastic material capable of sealing between the drum rear surface 220 and the flow portion 431 without deterioration in performance despite a frictional force and a frictional heat generated based on the rotation.

In some examples, the leakage prevention between the duct plate 440 and one surface of the rear plate 420 will be described in detail.

As described above, the flow portion support 4433 of the flow portion shielding portion 443 can be recessed rearwards to be in contact with the mounting support 4531 of the mounting portion 450 that has the shape corresponding thereto, and the inlet support 4413 of the inlet shielding portion 441 can be recessed rearwards to be in contact with the inlet support coupling portion 423 of the rear plate 420 that has the shape corresponding thereto.

Because of the curved shapes of the flow portion support 4433 and the inlet support 4413, the hot air flowing through the flow space V of the duct 430 can be prevented from leaking between the duct plate 440 and one surface of the rear plate 420 as much as possible.

In addition, an area of the flow portion support 4433 in contact with the mounting support 4531 equal to or greater than a certain area can be secured, and an area of the inlet support 4441 in contact with the inlet support coupling portion 423 equal to or greater than a certain area can be secured, so that the leakage of the hot air can be more effectively prevented.

Further, an end of the flow portion coupling portion 4431 can protrude frontwards to be in contact with the circumference of the mounting accommodating portion 451, and the leakage of the hot air between the flow portion shielding portion 443 and the mounting portion 450 can be prevented more effectively.

FIGS. 10A to 10C are views showing an example of a fan duct. Specifically, FIG. 10A is a front view of the fan duct, FIG. 10B is a rear view of the fan duct, and FIG. 10C is a side view of the fan duct.

Referring to FIG. 4 and FIGS. 10A to 10C, the laundry treating apparatus 10 can include the fan duct 850. The fan duct 850 can connect the hot air supply 900 and the inlet 433 to each other to guide the hot air from the hot air supply 900 to the second flow space V2 of the inlet 433.

The fan duct 850 can include a fan duct inlet 8511. The fan duct inlet 8511 can be connected to the blower fan housing 963 of the hot air supply 900 to receive the hot air. The fan duct inlet 8511 can be formed in a shape corresponding to a portion from which the hot air is discharged from the blower fan housing 963.

For example, as shown in FIGS. 4 and FIGS. 10A to 10C, the hot air can be discharged from an upper end of the blower fan housing 963, and the fan duct inlet 8511 can have a shape corresponding to a portion from which the hot air is discharged of the upper end of the blower fan housing 963 and coupled to the blower fan housing 963.

A portion of the fan duct inlet 8511 can be inserted into and coupled to the blower fan housing 963. Accordingly, the fan duct inlet 8511 can receive the hot air from the inside of the blower fan housing 963.

That is, as the fan duct inlet 8511 is inserted into and coupled to the blower fan housing 963, the fan duct inlet 8511 can receive a strong coupling force, and the leakage of the hot air to the outside through the space between the fan duct inlet 8511 and the blower fan housing 963 can be prevented as much as possible.

In addition, the fan duct inlet 8511 can include an inlet fastening portion 8511a including a plurality of inlet fastening portions along a circumference thereof in order to be coupled to the blower fan housing 963. The inlet fastening portion 8511a can be coupled to the blower fan housing 963 by being penetrated by a separate fastening member. The inlet fastening portion 8511a can provide a coupling force such that the entire fan duct 850 can be strongly fixed to the blower fan housing 963.

In some examples, the fan duct 850 can include a fan duct body 851. The fan duct body 851 can form an appearance of the fan duct 850. The fan duct body 851 can provide therein a space for the hot air introduced from the hot air supply 900 to flow, and can guide the hot air to the second flow space V2 of the inlet 433.

The fan duct body 851 can have one side connected to the blower fan housing 963 and the other side connected to the inlet shielding portion 441. That is, one side of the fan duct body 851 can be the fan duct inlet 8511 described above, and the other side can be a fan duct outlet 8513 to be described later.

Specifically, in the fan duct body 851, a portion connected to the blower fan housing 963 can be disposed in parallel with the bottom plate 147, and a portion connected to the duct plate 440 can be disposed in parallel with the rear plate 420. The fan duct body 851 can extend from the blower fan housing 963 to the duct plate 440 in a curved shape.

In addition, an outer circumferential surface of the fan duct body 851 can be shaped to be prevented from being in contact with other components. For example, the fan duct 850 can be disposed outwardly of the drum 200, and a portion of the outer circumferential surface of the fan duct body 851 facing the drum 200 can be formed in a shape that is recessed to be away from the drum 200 to prevent contact with the drum 200. A shape of the fan duct body 851 can be variously set considering the placement of the inlet 433, the placement of the blower fan housing 963, the placement of the drum 200, and the like.

In some examples, the fan duct 850 can include the fan duct outlet 8513. The fan duct outlet 8513 can provide the hot air flowing inside the fan duct body 851 to the second flow space V2 of the inlet 433.

Specifically, the fan duct outlet 8513 can be disposed in parallel with the inlet shielding portion 441 of the duct plate 440. Accordingly, the fan duct outlet 8513 can be easily inserted into the plate inlet 4411 of the inlet shielding portion 441, and the hot air can be guided into the second flow space V2 while being prevented from leaking.

In addition, the fan duct outlet 8513 can be prevented from being in contact with the drum 200. That is, the fan duct outlet 8513 can be formed in a curved shape as a circumference thereof facing the drum 200 is recessed to be away from the drum 200. The drum 200 can be formed in a cylindrical shape, and the fan duct outlet 8513 can be formed in a shape of an arc whose circumference facing the drum 200 corresponds to a circumference of the drum 200. A shape of a circumference of the fan duct outlet 8513 that does not face the drum can be determined through relationships with other components.

For example, as shown in FIGS. 10A to 10C, the circumference of the fan duct outlet 8513 facing the drum 200 can be recessed and formed in a curved shape, where a portion of the circumference of the fan duct outlet 8513 can be connected to the circumference of the fan duct outlet 8513 facing the drum 200 and extend parallel to the bottom plate 147. Another portion of the circumference of the fan duct outlet 8513 can be connected to the circumference of the fan duct outlet 8513 facing the drum 200 and extend parallel to the first side plate 1411.

Accordingly, the fan duct outlet 8513 can be prevented from being in contact with all of the drum 200, the first side plate 1411, and the hot air supply 900, and can easily supply the hot air to the second flow space V2.

In some examples, as described above, the plate inlet 4411 of the inlet shielding portion 441 can have the shape corresponding to the shape of the fan duct outlet 8513, so that the fan duct outlet 8513 can be easily coupled thereto.

FIG. 8 shows that the shape of the plate inlet 4411 corresponds to the shape of the fan duct outlet shown in FIGS. 10A to 10C. That is, the plate inlet 4411 can be formed in a shape of an arc whose circumference facing the drum 200 forms a portion of a circle, a portion of the circumference that is connected to the circumference formed in the shape of the arc can extend in parallel with the bottom plate 147, and another portion of the circumference that is connected to the circumference formed in the shape of the arc can extend in parallel with the first side plate 1411.

In some examples, referring to FIGS. 10A to 10C again, the fan duct 850 can further include a fan duct coupling portion 8515. The fan duct coupling portion 8515 can fix the fan duct 850 to the inlet shielding portion of the duct plate 440.

Specifically, the fan duct coupling portion 8515 can extend along the circumference of the fan duct outlet 8513, and can extend outwardly of the fan duct outlet 8513. That is, the fan duct coupling portion 8515 can extend to be away from the plate inlet 4411 of the inlet shielding portion 441 to face a shielding surface of the inlet shielding portion 441. The shielding surface of the inlet shielding portion 441 can be a surface shielding the open front surface of the inlet 433.

The fan duct coupling portion 8515 can include a plurality of fastening holes along a circumference thereof. A separate fastening member can pass through the fastening hole and the shielding surface of the inlet shielding portion 441 together, so that the fan duct 850 can be fixed to the inlet shielding portion 441.

In addition, the fan duct coupling portion 8515 can be prevented from being in contact with the inlet support 4413 of the inlet shielding portion 441. That is, the fan duct coupling portion 8515 can be located between the plate inlet 4411 and the inlet support 4413, and may not affect the inlet support 4413 even when the separate fastening member passes through the fastening hole of the fan duct coupling portion 8515.

From another point of view, the inlet shielding portion 441 can include a coupling hole through which the separate fastening member passes together with the fan duct coupling portion 8515, and the flow portion coupling hole 4435 can be located outwardly of the inlet support 4413 to prevent interference with the inlet support 4413 and can include a plurality of flow portion coupling holes disposed along the circumference of the inlet support 4413.

More specifically, the fan duct outlet 8513 can be inserted into the plate inlet 4411, and the fan duct coupling portion 8515 can be coupled to the shielding surface of the inlet shielding portion 441 at a location outward of the plate inlet 4411.

In some examples, referring to FIG. 2 and FIGS. 5A to 5C, the laundry treating apparatus 10 can include a hot air disposition portion 437. A portion of the hot air supply 900 can be disposed in the hot air disposition portion 437.

Specifically, the hot air disposition portion 437 can be spaced apart from the inlet 433 in a direction toward the hot air supply 900. The hot air disposition portion 437 can be recessed rearwards from one surface of the rear plate 420 to define a space therein, and can have an open front surface to dispose the portion of the hot air supply 900 therein, thereby increasing a space that can be utilized inside the cabinet 100.

The hot air disposition portion 437 can be partitioned from the inlet 433, and can be spaced apart from the inlet shielding portion 441 of the duct plate 440 that shields the open front surface of the inlet 433. Accordingly, the hot air disposition portion 437 can prevent interference between the components of the hot air supply 900 disposed in the inlet shielding portion 441 and the hot air disposition portion 437.

A separation distance between the hot air disposition portion 437 and the inlet 433 can be determined in consideration of a size and arrangement relationships with other components of the inlet shielding portion 441, positions and sizes of the components disposed in the hot air disposition portion 437, and the like.

As the hot air disposition portion 437 is defined in the rear plate 420, the hot air disposition portion 437 can accommodate a rear end of the hot air supply 900 therein, and the rear end of the hot air supply 900 can be a portion of the blower 960.

That is, the hot air disposition portion 437 can accommodate the blower fan driver 965 of the blower 960 therein. As described above, the blower fan driver 965 can be coupled to the blower fan housing 963 through which the hot air flows from the rear, and the hot air disposition portion 437 can accommodate the blower fan driver 965 therein, so that a size of the blower fan housing 963 can become larger or a length of the hot air flow channel 920 of the hot air supply 900 connected to the blower fan housing 963 can become larger.

A shape of the hot air disposition portion 437 can be determined to a shape that can accommodate the blower fan driver 965 therein, and can be determined in consideration of a manufacturing situation, a manufacturing condition, and the like. For example, as shown in FIGS. 5A to 5C, the hot air disposition portion 437 can be recessed in a rectangular shape.

Although representative implementations of the present disclosure have been described in detail above, those of ordinary skill in the technical field to which the present disclosure belongs will understand that various modifications are possible with respect to the above-described implementation without departing from the scope of the present disclosure. Therefore, the scope of the present disclosure should not be limited to the described implementation, and should be defined not only by the claims described below, but also by these claims and equivalents thereof.

What is claimed is:

1. A laundry treating apparatus comprising:
   a cabinet having a laundry inlet defined at a front surface thereof;

a drum rotatably disposed inside the cabinet and configured to accommodate laundry received through the laundry inlet;

an air supply disposed inside the cabinet and configured to supply air toward the drum;

a rear plate that defines a rear surface of the cabinet, the rear plate defining a rear duct configured to receive the air supplied from the air supply and to guide the air into the drum through a drum rear surface;

a sealing portion that has a shape corresponding to an outer circumferential surface of the drum, the sealing portion being coupled to an outer circumferential surface of the rear duct and configured to block leakage of the air out of the drum;

a fan duct that connects the air supply to the rear duct and is configured to guide the air from the air supply to the rear duct; and a duct plate that is coupled to the rear plate and the fan duct, wherein the rear duct comprises:

a flow portion configured to carry the air received from the fan duct, the flow portion having an open front surface that faces the drum rear surface and is configured to provide the air to the drum rear surface, and an inlet that extends from the flow portion toward the fan duct, the inlet having an inlet front surface that is opened, and wherein the duct plate covers the inlet front surface.

2. The laundry treating apparatus of claim 1, wherein the flow portion and the inlet are recessed rearward from a front surface of the rear plate facing the drum, the duct plate being coupled to the front surface of the rear plate, and wherein an area of the duct plate is greater than an area of the inlet front surface such that the duct plate covers the inlet front surface.

3. The laundry treating apparatus of claim 2, wherein the fan duct comprises:

a fan duct outlet opened toward an interior of the inlet and configured to discharge the air supplied from the air supply toward the flow portion; and a fan duct coupling portion that extends along a circumference of the fan duct outlet and is coupled to the duct plate.

4. The laundry treating apparatus of claim 3, wherein the fan duct is disposed radially outward relative to the drum, and wherein a portion of the circumference of the fan duct outlet faces the drum and is recessed away from the drum to thereby be spaced apart from the drum.

5. The laundry treating apparatus of claim 2, wherein the duct plate comprises:

an inlet shielding portion that covers the inlet front surface and is coupled to the fan duct; and a flow portion shielding portion that extends from the inlet shielding portion toward the flow portion and covers a portion of the open front surface of the flow portion.

6. The laundry treating apparatus of claim 5, wherein the inlet shielding portion extends to an outer circumference of the flow portion, and wherein the flow portion shielding portion extends from the outer circumference of the flow portion to an interior of the flow portion.

7. The laundry treating apparatus of claim 6, wherein the flow portion has an annular shape extending in a circumferential direction, wherein a circumferential length of the flow portion shielding portion in the circumferential direction is greater than a circumferential length of the inlet in the circumferential direction, and wherein the flow portion shielding portion is connected to the inlet shielding portion at a position radially outward of a circumference of the inlet.

8. The laundry treating apparatus of claim 6, wherein the flow portion has an annular shape and is configured to guide the air introduced from the inlet in a first circumferential direction and a second circumferential direction opposite to the first circumferential direction, and wherein the flow portion shielding portion extends farther than the inlet front surface in the first circumferential direction and in the second circumferential direction.

9. The laundry treating apparatus of claim 5, further comprising a driver coupled to the rear plate from a rear side of the rear plate and configured to rotate the drum, wherein the rear plate further comprises a mounting portion that is surrounded by the flow portion, the driver being coupled to a center of the mounting portion, and wherein the flow portion shielding portion comprises a flow portion coupling portion that extends toward the driver and is coupled to the mounting portion from a front side of the mounting portion.

10. The laundry treating apparatus of claim 9, wherein the mounting portion comprises:

a mounting accommodating portion that protrudes forward relative to the flow portion and is coupled to the driver; and a mounting circumferential portion that surrounds the mounting accommodating portion and faces an inner circumference of the flow portion, and wherein an end of the flow portion coupling portion protrudes to the mounting circumferential portion and is in contact with a circumference of the mounting circumferential portion.

11. The laundry treating apparatus of claim 10, wherein the flow portion shielding portion further comprises a flow portion support that protrudes rearward from the flow portion coupling portion and extends along the mounting circumferential portion, and wherein the mounting portion defines a mounting support that accommodates the flow portion support therein, the mounting support being recessed from the mounting circumferential portion in a shape corresponding to the flow portion support.

12. The laundry treating apparatus of claim 11, wherein the mounting support is defined at a portion where the mounting circumferential portion and the flow portion are connected to each other.

13. The laundry treating apparatus of claim 12, wherein the sealing portion comprises an inner sealing portion that is disposed at the mounting circumferential portion and extends in an annular shape along the inner circumference of the flow portion, wherein the drum has a drum inlet defined at the drum rear surface and configured to receive the air from the flow portion, wherein the inner sealing portion is configured to block the air from leaking out of the drum inlet and the flow portion, and wherein a portion of a circumference of the inner sealing portion is disposed at and supported by the flow portion support.

14. The laundry treating apparatus of claim 6, wherein the duct plate comprises an inlet support that protrudes rearward from a boundary between the flow portion shielding portion and the inlet shielding portion, the inlet support extending along the boundary.

15. The laundry treating apparatus of claim 14, wherein ends of the inlet support are disposed outside the inlet, and
wherein the rear plate defines inlet support coupling portions that are recessed away from the drum and coupled to the ends of the inlet support, respectively, the inlet support coupling portions having shapes corresponding to the ends of the inlet support.

16. The laundry treating apparatus of claim 15, wherein the sealing portion comprises an outer sealing portion that is disposed at the front surface of the rear plate and extends in an annular shape along the outer circumference of the flow portion,
wherein the drum has a drum inlet defined at the drum rear surface and configured to receive the air from the flow portion,
wherein the outer sealing portion is configured to maintain contact with the outer circumferential surface of the drum to thereby block the air from leaking out of the drum inlet and the flow portion, and
wherein a portion of a circumference of the outer sealing portion is disposed at and supported by the inlet support.

17. The laundry treating apparatus of claim 1, wherein the rear plate further comprises an air disposition portion spaced apart from the inlet and recessed rearward from a front surface of the rear plate facing the drum, the air disposition portion being opened toward the drum and receiving a portion of the air supply.

18. The laundry treating apparatus of claim 17, wherein the air disposition portion and the inlet are separate spaces defined at the front surface of the rear plate, the air disposition portion being spaced apart from the duct plate.

19. The laundry treating apparatus of claim 17, wherein the air supply comprises a blower configured to cause the air to move into the drum along the air supply, and
wherein the air disposition portion receives a portion of the blower.

20. The laundry treating apparatus of claim 17, wherein the flow portion has an annular shape extending in a circumferential direction, the inlet extending radially outward from a portion of the flow portion, and
wherein the air disposition portion is defined at a position below the inlet.

* * * * *